United States Patent
Jones et al.

(10) Patent No.: US 8,817,240 B2
(45) Date of Patent: *Aug. 26, 2014

(54) INTERCHANGEABLE OPTICS CONFIGURATION FOR A CHROMATIC RANGE SENSOR OPTICAL PEN

(75) Inventors: Benjamin Keith Jones, Seattle, WA (US); Scott Allen Harsila, Bothell, WA (US); Andrew Michael Patzwald, Kirkland, WA (US); David William Sesko, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 75 days.

This patent is subject to a terminal disclaimer.

(21) Appl. No.: 13/542,144

(22) Filed: Jul. 5, 2012

(65) Prior Publication Data

US 2013/0314690 A1  Nov. 28, 2013

Related U.S. Application Data

(63) Continuation-in-part of application No. 13/481,734, filed on May 25, 2012.

(51) Int. Cl.
    *G01C 3/08* (2006.01)
(52) U.S. Cl.
    USPC .......... 356/4.01; 356/3.01; 356/4.1; 356/5.01
(58) Field of Classification Search
    USPC ............. 356/3.01–3.15, 4.01–4.1, 5.01–5.15, 356/6–22, 28, 28.5
    See application file for complete search history.

(56) References Cited

U.S. PATENT DOCUMENTS

| | | | |
|---|---|---|---|
| 4,651,405 | A | 3/1987 | McMurtry |
| 4,688,307 | A | 8/1987 | Schneider |

(Continued)

FOREIGN PATENT DOCUMENTS

| | | |
|---|---|---|
| DE | 10 2007 054 915 A1 | 5/2009 |
| WO | 2009/062641 A1 | 3/2009 |

OTHER PUBLICATIONS

European Search Report dated Aug. 21, 2013, in European Patent Application No. 13 16 9336.8 filed May 27, 2013, 6 pages.

(Continued)

*Primary Examiner* — Luke Ratcliffe
(74) *Attorney, Agent, or Firm* — Christensen O'Connor Johnson Kindness PLLC

(57) ABSTRACT

An optical pen for use in a chromatic range sensor (CRS) may be used in a probe system for a coordinate measuring machine (CMM). The optical pen includes a confocal optical path, an interchangeable optics element, an optical pen base member, and a repeatable fast exchange mount. The confocal optical path includes a confocal aperture and a chromatically dispersive optics portion. The interchangeable optics element includes the chromatically dispersive optics portion. The optical pen base member includes an external mounting surface for mounting to an external reference frame. The repeatable fast exchange mount includes a first mating half located on the base member and a second mating half located on the interchangeable optics element. The repeatable fast exchange mount is configured to allow the base member to receive and hold the interchangeable optics element in a fixed relationship relative to the base member and the external reference frame.

31 Claims, 20 Drawing Sheets

(56) References Cited

U.S. PATENT DOCUMENTS

| | | |
|---|---|---|
| 4,908,951 A | 3/1990 | Gurny |
| 4,979,284 A | 12/1990 | McMurtry |
| 5,118,956 A | 6/1992 | Dunning |
| 5,323,540 A | 6/1994 | McMurtry |
| 5,339,535 A | 8/1994 | McMurtry |
| 5,505,005 A | 4/1996 | McMurtry |
| 5,526,576 A | 6/1996 | Fuchs |
| 5,657,549 A | 8/1997 | Shen |
| 5,705,814 A | 1/1998 | Young |
| 5,825,666 A | 10/1998 | Freifeld |
| 6,093,930 A | 7/2000 | Boyette, Jr. |
| 6,275,053 B1 | 8/2001 | Morrison |
| 6,546,643 B2 | 4/2003 | Lotze |
| 6,633,051 B1 | 10/2003 | Holloway |
| 6,940,610 B2 | 9/2005 | Prinzhausen |
| 6,945,100 B2 | 9/2005 | Kwon |
| 7,096,077 B2 | 8/2006 | Price |
| 7,369,225 B2 | 5/2008 | Messerschmidt |
| 7,486,394 B2 | 2/2009 | Lehmann |
| 7,626,705 B2 | 12/2009 | Altendorf |
| 7,652,275 B2 | 1/2010 | Gladnick |
| 7,722,515 B2 | 5/2010 | McMurty |
| 7,876,456 B2 | 1/2011 | Sesko |
| 7,891,248 B2 | 2/2011 | Hough |
| 7,908,757 B2 | 3/2011 | Ferrari |
| 7,990,522 B2 | 8/2011 | Sesko |
| 8,099,793 B2 | 1/2012 | Jo |
| 8,194,251 B2 | 6/2012 | Emtman |
| 8,212,997 B1 | 7/2012 | Xie |
| 2002/0146276 A1 | 10/2002 | Le Guin |
| 2003/0015653 A1 | 1/2003 | Hansma |
| 2004/0165191 A1 | 8/2004 | Breider |
| 2008/0024793 A1 | 1/2008 | Gladnick |
| 2008/0052936 A1 | 3/2008 | Briggs |
| 2009/0082986 A1 | 3/2009 | Pettersson |
| 2009/0165317 A1 | 7/2009 | Little |
| 2010/0312524 A1 | 12/2010 | Siercks |
| 2011/0037987 A1 | 2/2011 | Gurny |
| 2011/0080588 A1 | 4/2011 | Segall |
| 2011/0229091 A1 | 9/2011 | Jensen |
| 2011/0258868 A1 | 10/2011 | Jordil |
| 2012/0050723 A1 | 3/2012 | Emtman |
| 2012/0110866 A2 | 5/2012 | Jensen |
| 2013/0097882 A1 | 4/2013 | Bridges |
| 2013/0163006 A1 | 6/2013 | Sesko |
| 2013/0222815 A1* | 8/2013 | Patzwald ...................... 356/612 |

OTHER PUBLICATIONS

Jones, B. K., et al., "Interchangeable Chromatic Range Sensor Probe for a Coordinate Measuring Machine," U.S. Appl. No. 13/481,734, filed May 25, 2012.

"Accessories for STIL Point Sensors," Stil S.A., Aix en Provence, France, <http://www.stilsa.com/EN/prod/chr/accessories.htm> [retrieved Apr. 26, 2012], 1 page.

"Confocal Chromatic Displacement Sensors," Micro-Epsilon Messtechnik GmbH & Co. KG, Ortenburg, Germany, [n.d.], 12-page brochure.

"Non-Contact <<Point>> Sensors," STIL E-Catalog, E1104, STIL S.A., Aix en Provence, France, [n.d.], pp. 4-27.

"Non-Contact 3D Measurement Systems," STIL E-Catalog, E1010, Stil S.A., Aix en Provence, France, [n.d.], pp. 44-49.

European Search Report dated Aug. 21, 2013, in European Patent Application No. 13 16 9331.9 filed May 27, 2013, 6 pages.

* cited by examiner

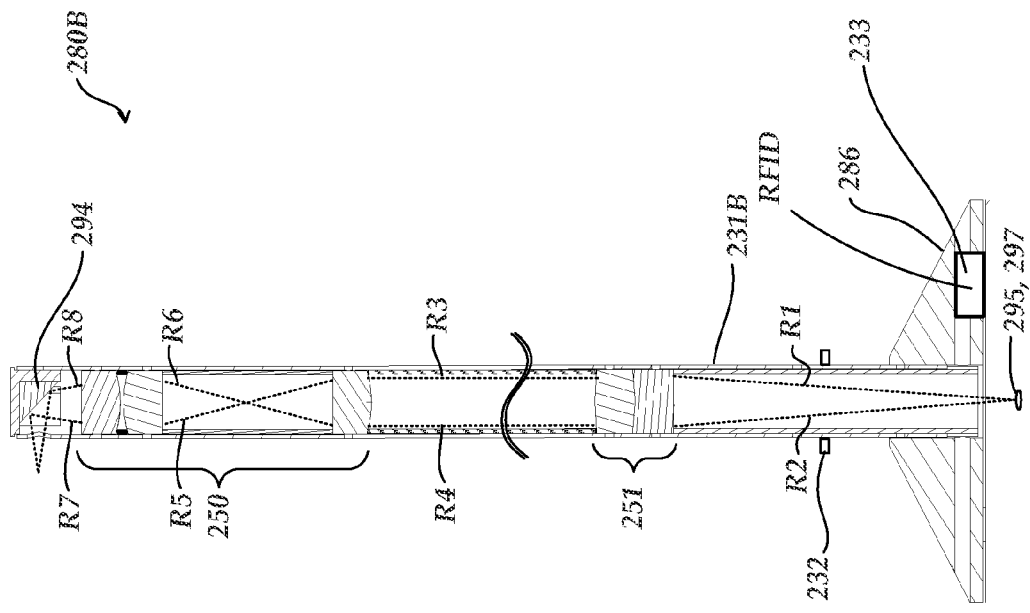
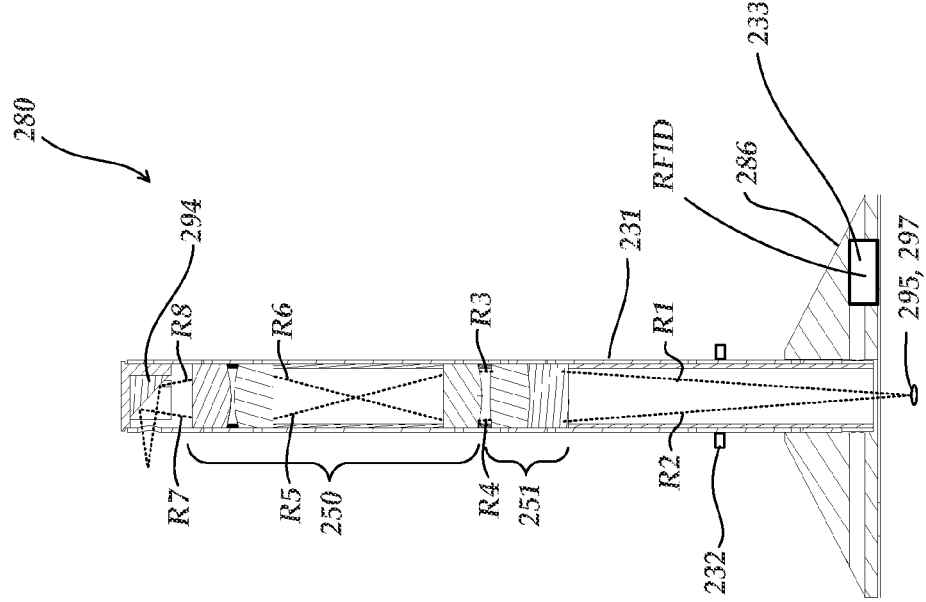

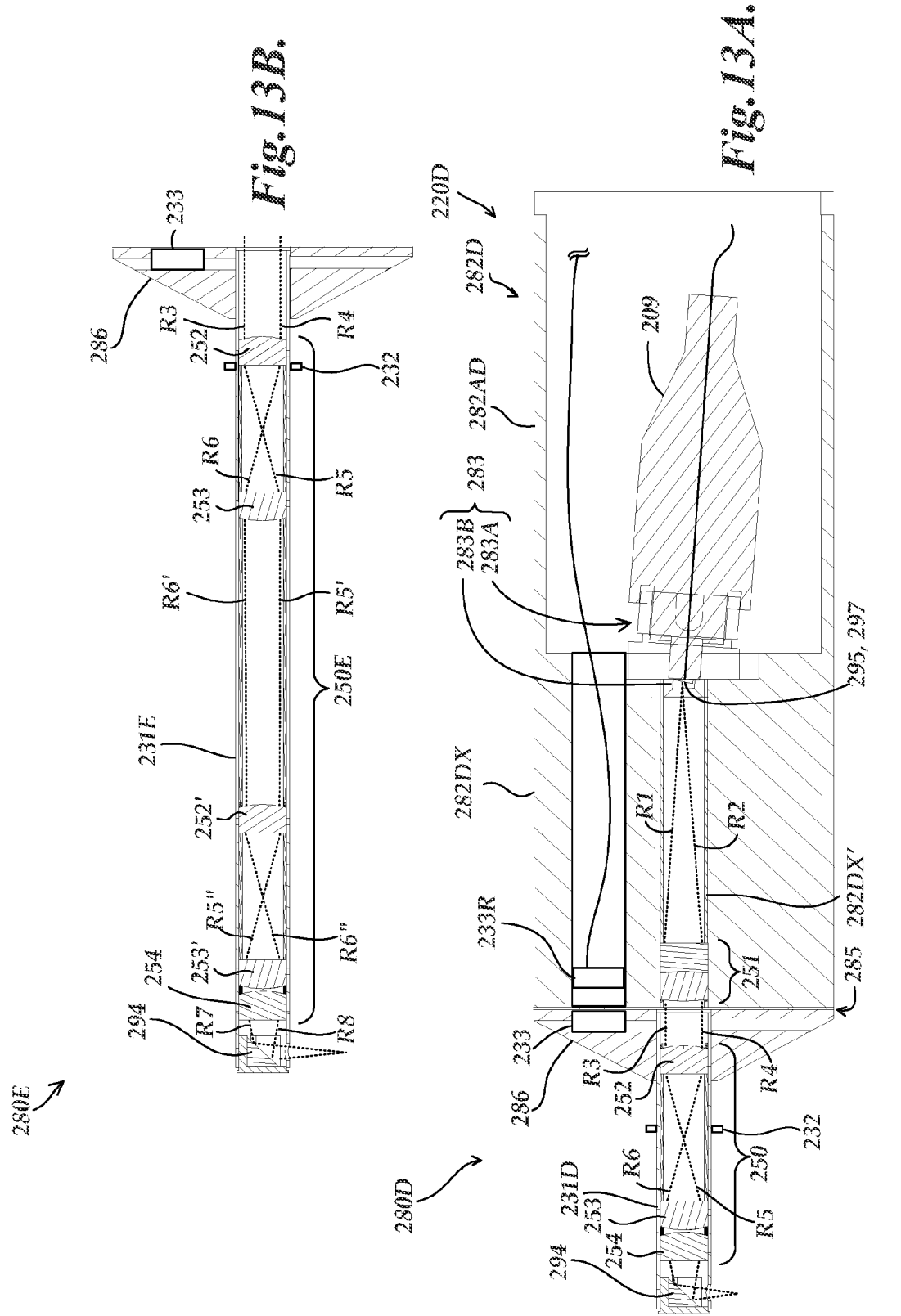

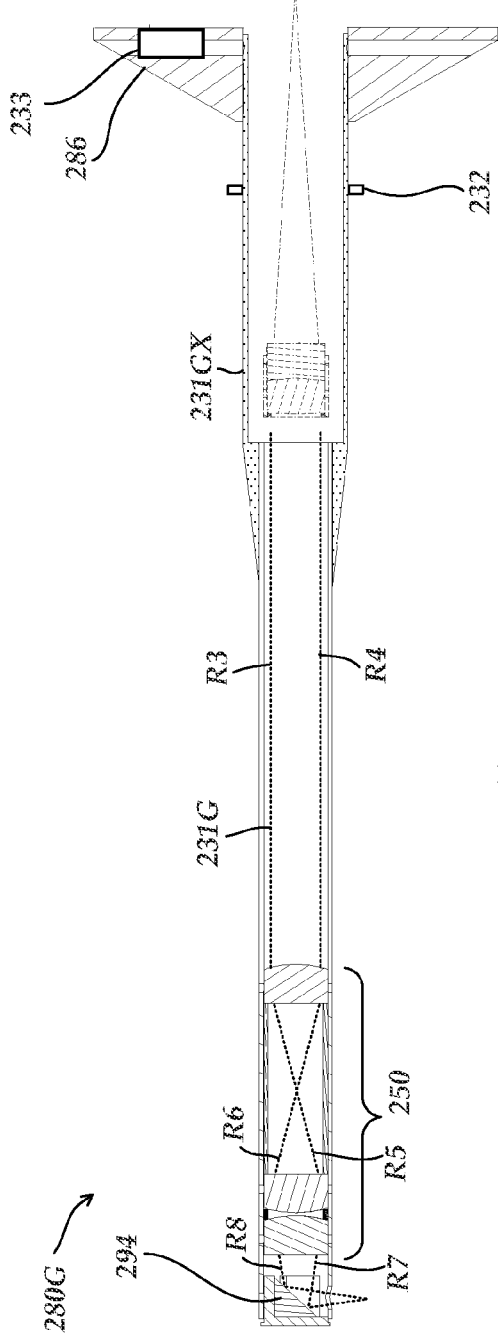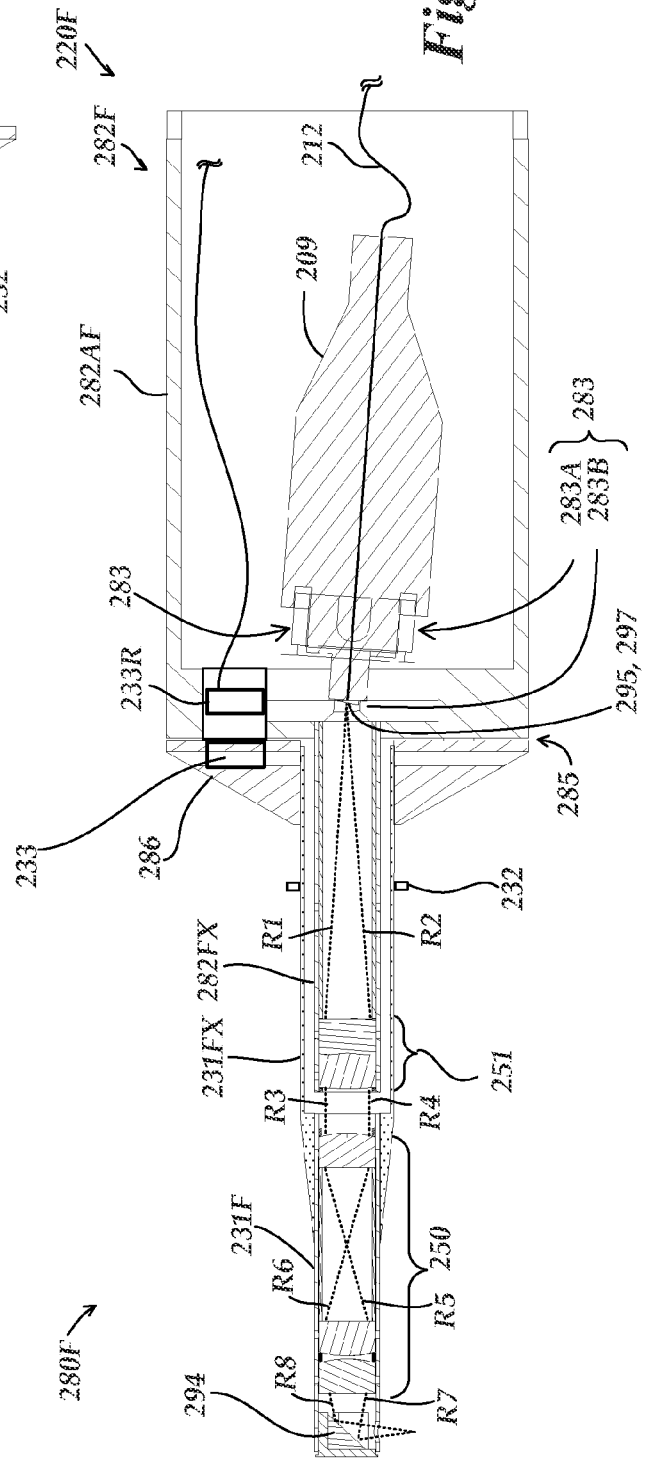

INTERCHANGEABLE OPTICS CONFIGURATION FOR A CHROMATIC RANGE SENSOR OPTICAL PEN

CROSS-REFERENCE(S) TO RELATED APPLICATION(S)

This application is a continuation-in-part of U.S. patent application Ser. No. 13/481,734, filed May 25, 2012, priority from the filing date of which is hereby claimed under 35 U.S.C. §120, the disclosure of which is incorporated herein by reference.

FIELD

The disclosure relates generally to precision measurement instruments, and more particularly to optics configurations for chromatic range sensor optical pens such as may be used in a probe system for a coordinate measuring machine.

BACKGROUND

In one type of coordinate measuring machine, the surface of a workpiece is scanned with a probe. After the scan, a three dimensional profile of the workpiece is provided. In one type of scanning probe, the workpiece is directly measured by touching a mechanical contact of the probe to various points along the workpiece surface. In some cases, the mechanical contact is a ball.

In other coordinate measuring machines, an optical probe is utilized which measures the workpiece without making physical contact with the surface. Certain optical probes (e.g., triangulation probes) utilize light to measure workpiece surface points, and some optical probes comprise video cameras which are used to image 2-D sections of the workpiece surface (e.g., stereo vision systems, or structured light systems). In some systems, the coordinates of the geometric elements of the workpiece are determined via image processing software.

Certain "combined" coordinate measuring machines that use both optical and mechanical measuring sensors are also known. One such device is described in U.S. Pat. No. 4,908,951, which is hereby incorporated by reference in its entirety. The described apparatus has two spindles, one that carries the mechanical probe, and one that holds a video camera having a beam path into which a laser probe is simultaneously reflected for making measurements in the Z coordinate, that is, along the optical axis of the video camera.

U.S. Pat. No. 5,825,666, which is hereby incorporated by reference in its entirety, describes an optical coordinate measuring machine wherein an optical touch probe of the device has a first target on the distal end thereof, on the contact element of a standard probe. The standard probe is mounted to a video camera to image the target on the camera. Movement and position of the target in the X and Y coordinates is indicated by the machine's computer image processing system. A second target is mounted to the proximal end of the probe and indicates movement and position in the Z coordinate. The second target may obscure a photo detector, but can be par-focused on the camera by a light beam parallel to the X, Y plane. There can be two second targets illuminated by orthogonal beams parallel to the X, Y plane. Rotation around the Z axis then may be calculated by the computer when star probes are used. Auto changing racks are also disclosed for holding multiple probes, a probe holder, and lenses for selective mounting on the camera.

Measuring probes are frequently interchangeably attached to coordinate measuring machines at an auto exchange joint connection (also referred to as an "autojoint", in some contexts) included in various "probe heads." At present, Renishaw™ probe heads are the most commonly used for certain applications in the industry. These probe heads are manufactured by Renishaw Metrology Limited in Gloucestershire, United Kingdom. While Renishaw-type probe head systems are the most commonly used in the industry, certain technologies are not easily incorporated into Renishaw-type systems. Furthermore, attempts to upgrade an existing Renishaw-type probe head system to one with more advanced capabilities can entail significant costs and/or inconvenience. For example, certain technologies adapted to a Renishaw-type probe head system may lack desirable features, lack a desirable level of controllability, and/or lack the capacity for being automatically interchangeable (e.g., interchangeable under machine control without human intervention) with other types of probes that are configured to be interfaced to the Renishaw-type probe head system. One particular issue with regard to using Renishaw-type probe head systems, or similar systems, is that the existing data and control connections between the machines and the probes consist of a limited number of wired connections and no optical fiber connections or optical paths at the auto exchange joint. This effectively forms a "bottleneck" which makes it difficult to add additional technologies and/or features to a probe that is to be mounted and/or exchanged using the probe head system. In particular, existing chromatic range sensors have not been attachable and/or interchangeable using a Renishaw-type probe head system, or the like. The architecture of existing chromatic range sensors is not compatible with data and control connections included in Renishaw-type probe head systems. A chromatic range sensor probe that is automatically attachable and/or interchangeable on a coordinate measuring machine (CMM), for example, using a Renishaw-type probe head system would be desirable.

A related issue with existing chromatic range sensors is that even if the architecture of a chromatic range sensor could be devised such that it might be included in a chromatic range sensor probe system that is automatically attachable and/or interchangeable on a CMM (e.g., using a Renishaw-type probe head system), existing types of chromatic range sensor optical pens are designed for manual replacement and are not automatically interchangeable. Thus, a chromatic range sensor probe system would still be limited in its utility due to an inflexible measurement range and/or direction associated with a particular optical pen used in the probe. This inflexibility would be a significant barrier to the creation and adoption of a chromatic range sensor probe system, which may have a poor cost/benefit ratio if it cannot have its measurement range and/or accuracy altered quickly and reliably as needed for a particular measurement operation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure describes an optical pen that can provide the capability to be easily and/or automatically modified (e.g., such as may allow the measuring range and/or measuring direction of the chromatic range sensor probe to be adjusted). Such an optical pen can provide benefits in conventional applications (e.g., allowing rapid manual alteration) and can be of particular benefit when used as part of a chromatic range sensor probe system (e.g., on a CMM and/or allowing rapid automatic modification).

An optical pen for use in a chromatic range sensor (CRS) is provided. In accordance with one aspect, the optical pen includes a confocal optical path, an interchangeable optics element, an optical pen base member, and a repeatable fast exchange mount. The confocal optical path includes at least a confocal aperture and a chromatically dispersive optics portion, and the optical pen is configured to focus different wavelengths at different distances along a measurement axis proximate to a workpiece surface to be measured. The interchangeable optics element includes the chromatically dispersive optics portion. The repeatable fast exchange mount includes a first mating half located on the base member and a second mating half located on the interchangeable optics element. The repeatable fast exchange mount is configured such that at a first time, it allows the base member to receive and hold the interchangeable optics element in a fixed relationship relative to the base member and the external reference frame to form an operational chromatic range sensor optical path and measurement beam.

The optical pen base member is configured to hold the optical pen in a stable relationship relative to an external reference frame for measurement. In various embodiments, the optical pen base member may comprise an external mounting surface configured for mounting the base member to an external element that defines the external reference frame. For example, the external element may comprise a fixed element that defines a fixed reference frame (e.g., a mounting stand for the optical pen), or the external element may comprise a CRS probe assembly mounted to a CMM (e.g., as disclosed herein), the CRS probe assembly mounted to the CMM defining an external reference frame comprising a machine coordinate system. In various embodiments, the base member provides the sole support for the interchangeable optics element, and supports the interchangeable optics element in a very stable manner (e.g., with insignificant vibration of the interchangeable optics element in the expected measuring environment). The base member and the repeatable fast exchange mount are distinguished from conventional optical fiber connectors which connect optical fibers to known optical pens. For example, such optical fiber connectors are not suitable for repeatably attaching and holding the optical pen in a stable relationship relative to an external reference frame for measurement. Nor has it been contemplated that such conventional optical fiber connectors could provide the sole support for an element holding the optics elements of an optical pen, such as the interchangeable optics element disclosed herein.

In accordance with another aspect, the optical pen may comprise an optical fiber end positioning arrangement, including at least an optical fiber-holding element included in the optical pen base member, wherein the optical fiber-holding element receives an optical fiber that is connected to a light source and a detector of the CRS system and holds the optical fiber relative to the base member such that the optical fiber end positioning arrangement locates the end of the optical fiber proximate to an operational position of the confocal aperture. In various embodiments, the operational position of the confocal aperture coincides with the position where the lenses of the optical pen nominally focus the measurement light that passes through the optical pen.

In some embodiments, the optical fiber-holding element may receive and hold the optical fiber rigidly relative to the base member, proximate to the operational position of the confocal aperture. In some embodiments, the optical fiber-holding element may include some compliance in holding or positioning the optical fiber, and the optical fiber end positioning arrangement may include an additional optical fiber end positioning element included in one of the optical pen base member and the interchangeable optics element, wherein the optical fiber end positioning element is configured to stabilize the end of the optical fiber proximate to the operational position of the confocal aperture. For example, in one embodiment, the optical fiber and its end may be fixed in a spring-loaded ferrule such as may be found in an optical fiber connector, and the optical fiber end positioning element may include a recessed surface including a light transmission hole surrounded by a guide for the ferrule (e.g., a hole, a tapered hole, or a chamfered shoulder, or the like). The guide guides the spring-loaded ferrule to the recessed surface, where it abuts the recessed surface and is stabilized at a desired location defined by that recessed surface (e.g., at or proximate to the operational position of the confocal aperture). In some embodiments, the confocal aperture may consist of the end of the optical fiber. Alternatively, the confocal aperture may be an aperture in an aperture element (e.g., a foil or thin film aperture) that is fixed relative to the end of the optical fiber. In such cases, the optical fiber end positioning element may be configured to stabilize the end of the optical fiber such that the confocal aperture is stabilized proximate to the operational position.

In some embodiments, the optical fiber end positioning element may be included in the base member, the confocal aperture comprises an aperture in an aperture element that is fixed to at least one of the optical pen base member and the optical fiber end positioning element at the operational position, and the optical fiber end positioning element is configured to stabilize the end of the optical fiber proximate to the confocal aperture.

In some embodiments, the optical fiber end positioning element is included in the interchangeable optics element, the confocal aperture comprises an aperture in an aperture element that is fixed to at least one of the interchangeable optics element and the optical fiber end positioning element at the operational position, and the optical fiber end positioning element is configured to stabilize the end of the optical fiber proximate to the confocal aperture when the base member receives and holds the interchangeable optics element in the fixed relationship.

In accordance with another aspect, the optical pen base member includes a housing including the first mating half of the repeatable fast exchange mount. In one embodiment, the confocal aperture is fixed relative to the first mating half. In one embodiment, the first mating half consists of an end surface of the housing.

In accordance with another aspect, the interchangeable optics element includes an optical assembly that is fixed relative to the second mating half. The optical assembly includes the chromatically dispersive optics portion and receives measurement light from, and returns measurement light to, the confocal aperture, and provides axial chromatic dispersion of the measurement light over a respective measuring range along a measuring axis.

In accordance with another aspect, the optical assembly may further include a transfer lens configured to focus measurement light proximate to the operational position of the confocal aperture. In one embodiment, the operational position is located within the interchangeable optics element, and the optical assembly further includes at least one of an optical fiber end positioning element and an aperture element including an aperture located proximate to the operational position. In an alternative embodiment, the operational position of the confocal aperture is located within the optical pen base member, and the base member further includes at least one of an optical fiber end positioning element located proximate to the operational position and an aperture element including an aperture located proximate to the operational position.

In accordance with another aspect, the interchangeable optics element further includes a tube and a front plate. The tube at least partially encloses the chromatically dispersive optics portion, and the front plate is located proximate to the end of the tube. In one embodiment, the second mating half of the repeatable fast exchange mount consists of a surface of the front plate which faces away from the chromatically dispersive optics portion.

In accordance with another aspect, the second mating half of the repeatable fast exchange mount is forced against the first mating half of the repeatable fast exchange mount by a holding force arrangement comprising a permanent magnet mounted in one of the first and second mating halves.

In accordance with another aspect, the interchangeable optics element further includes an auto handling element that interfaces to a changing device that is utilized for connecting and separating the second mating half of the repeatable fast exchange mount to and from the first mating half of the repeatable fast exchange mount.

In accordance with another aspect, the interchangeable optics element further includes an ID element that is utilized for identifying the interchangeable optics element. In one embodiment, the ID element is a passive radio frequency identification device.

In accordance with another aspect, the confocal optical path comprises a transfer lens located between the confocal aperture and the chromatically dispersive optics portion, and the transfer lens is configured to focus measurement light proximate to the operational position of the confocal aperture. In one embodiment, the transfer lens is configured such that measurement light located between the transfer lens and the chromatically dispersive optics portion is approximately collimated.

In accordance with another aspect, in one embodiment, the transfer lens and the confocal aperture may be located in the optical pen base member. In alternative embodiments, the transfer lens may be located in the interchangeable optics element with the confocal aperture being located in either the optical pen base member or the interchangeable optics element.

In accordance with another aspect, the base member further comprises a rotary element which includes the first mating half and which rotates the interchangeable optics element relative to at least a portion of the optical pen base member. In one such embodiment, the optical pen is characterized by calibration data that includes unique respective calibration data corresponding to a plurality of respective rotary positions of the interchangeable optics element.

In accordance with another aspect, an interchangeable chromatic range sensor (CRS) probe (or CRS probe assembly) for a coordinate measuring machine (CMM) is provided, which may include the optical pen. At a first time, the CRS probe assembly may include the optical pen base member and may already be connected to the CMM through an auto exchange joint connection and the interchangeable optics element may be previously located separately from the optical pen base member, and the repeatable fast exchange mount is configured such that at the first time, the base member receives and holds the interchangeable optics element based on operations performed automatically by the CMM. Subsequently, at a second time after the first time, the CRS probe assembly may already be connected to the CMM through the auto exchange joint connection and include the optical pen base member and the interchangeable optics element, and the repeatable fast exchange mount is configured such that at the second time the interchangeable optics element is removable from the base member based on operations performed automatically by the CMM, without disconnecting the auto exchange joint connection that connects the CRS probe assembly to the CMM.

The CRS probe (or CRS probe assembly) is capable of being automatically connected to a CMM under program control. In one embodiment, in order to make the CRS probe compatible with a standard CMM auto exchange joint (e.g., one including a limited number of conductive connections and no optical fiber connections), all CRS measurement light transmitting and receiving elements (e.g., the light source, wavelength detector, optical pen, etc.) are included in the CRS probe assembly.

In accordance with another aspect, the CRS probe system includes an auto exchange joint element and a CRS probe assembly. The auto exchange joint element is attachable through a standard auto exchange joint connection to a CMM. The CRS probe assembly is mounted to the auto exchange joint element for automatic connection to the CMM through the auto exchange joint element.

In accordance with another aspect, the CRS probe assembly includes an optical pen, an electrically powered light source, and a CRS wavelength detector. The optical pen comprises a confocal optical path including a chromatically dispersive optics portion and is configured to focus different wavelengths at different distances along a measurement axis proximate to a workpiece surface to be measured. The electrically powered light source receives electrical power transmitted through the auto exchange joint element and generates light originating in the CRS probe assembly, and the light comprises an input spectral profile of wavelengths routed to the optical pen. The CRS wavelength detector comprises a plurality of pixels (that is, photodetector elements that are closely spaced) distributed with close spacing along a measurement axis of the CRS wavelength detector, and the plurality of pixels receive respective wavelengths reflected into the confocal optical path from the target surface and provide output spectral profile data.

In accordance with another aspect, the CRS probe assembly is configured to receive power and control signals through the auto exchange joint connection. The CRS probe assembly is configured such that when the auto exchange joint element is attached to a CMM and the optical pen is operably positioned relative to a workpiece surface to perform measurement operations and the electrically powered light source generates the light, the optical pen inputs the input spectral profile and outputs corresponding radiation to the workpiece surface through the confocal optical path and receives reflected radiation from the workpiece surface through the confocal optical path and outputs the reflected radiation to provide an output spectral profile to the CRS wavelength detector. The output spectral profile comprises a distance-dependent profile component having a wavelength peak that indicates a measurement distance from the optical pen to the workpiece surface, and the CRS wavelength detector provides corresponding output spectral profile data. The CRS probe assembly is configured to output measurement signals based on the output spectral profile data, and the output measurement signals are indicative of a measurement distance to the workpiece surface. In various embodiments, the output measurement signals are carried on at least one conductor through the auto exchange joint element. In some embodiments, some or all of the signals may be wirelessly transmitted and bypass the probe autojoint connection. It will be appreciated that a feature of the CRS probe configurations disclosed herein that allows them to be self-contained and/or automatically exchangeable is that they are configured to generate and process the light used for measurement entirely within the CRS probe assembly.

In accordance with another aspect, the output measurement signals comprise the output spectral profile data from the plurality of pixels of the CRS wavelength detector. In one implementation, the output measurement signals may be transmitted through a shielded coaxial cable included in the auto exchange joint and may be received through the auto exchange joint element by a probe signal processing and control circuit which determines measurement distances based on the output spectral profile data.

In accordance with another aspect, the CRS probe assembly further comprises an identification component which provides identification data for the CRS probe assembly that is output through the auto exchange joint element to at least one of the CMM and a probe signal processing and control circuit. In one implementation, the CRS probe assembly further comprises a memory portion which includes at least one of calibration data or compensation data for the CRS probe assembly. In another implementation, at least one of calibration data or compensation data for the CRS probe assembly is stored externally to the CRS probe assembly, e.g., in at least one of the CMM and a probe signal processing and control circuit that receives signals from the CRS probe assembly through the auto exchange joint element.

In accordance with another aspect, the center of mass of the optical pen is located proximate to an axis defined by the center of mass of the CRS probe assembly and the center of the auto exchange joint. In one implementation, the optical pen is mounted relative to the auto exchange joint such that the central axis of the optical pen is coaxial with the central axis of the auto exchange joint such that when the CMM rotates the auto exchange joint around its axis, the optical pen is also rotated around its central axis with no substantial lateral movement of the optical pen central axis due to the rotation. The central axis may be regarded as a reference axis for measurement distances determined by the CRS probe when the measurement beam of the probe is directed transverse to the central axis.

In accordance with another aspect, the CRS probe assembly is configured such that the optical pen is mounted at a distal end of the CRS probe assembly. In one implementation, the CRS probe assembly includes a base portion mounted to the auto exchange joint element, a wavelength detector mounting portion coupled to the base portion, and an optical pen mounting portion coupled to the base portion and carrying the optical pen without carrying the wavelength detector. In some embodiments, the optical pen mounting portion comprises a hollow structural tube that extends away from the base portion and toward the distal end of the CRS probe assembly.

In accordance with another aspect, the number of connections on the autojoint for the CRS probe are made to be consistent with existing systems. For example, existing Renishaw-type systems typically have standard connections with a standard number of pins (e.g., 13 pins). By providing an autojoint with standardized connections, existing systems can utilize the CRS probe more easily.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIGS. 11A and 11B are diagrams illustrating two exemplary embodiments of interchangeable optics elements that may be utilized in combination with the base member of the optical pen of FIG. 10;

FIGS. 13A and 13B are diagrams illustrating two exemplary embodiments of interchangeable optics elements and an optical pen in which a transfer lens is located in a base member;

FIGS. 14A and 14B are diagrams illustrating two exemplary embodiments of interchangeable optics elements and an optical pen in which a transfer lens is located in an extended tubular section of a base member;

DETAILED DESCRIPTION

Figure 1:
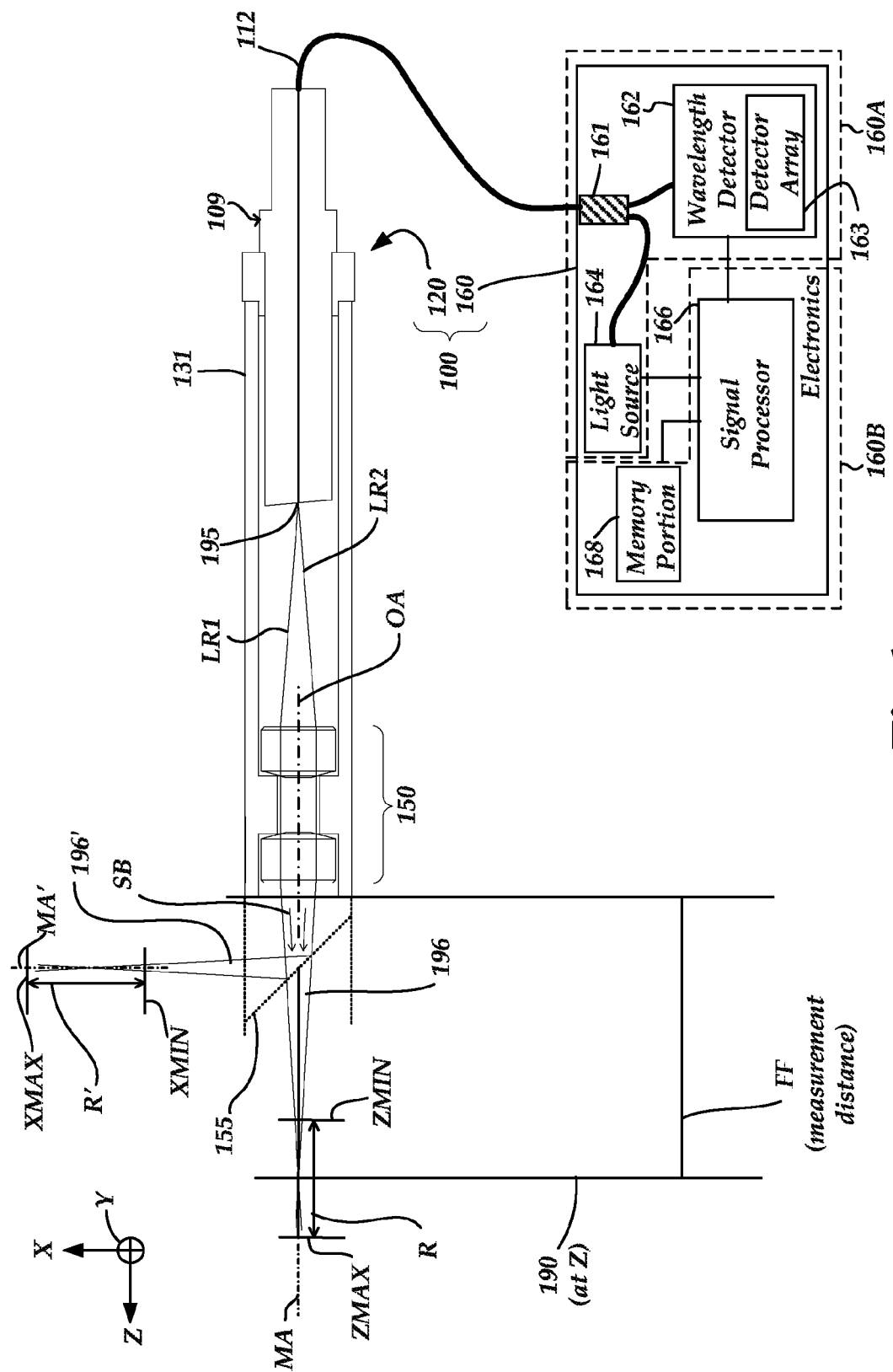
FIG. 1 is a block diagram of an exemplary CRS system including an optical pen.

FIG. 1 is a block diagram of an exemplary chromatic range sensor (CRS) system 100 of a first type based on operating principles that are desirable to employ in conjunction with a coordinate measuring machine. The CRS system 100 has certain similarities to sensors described in U.S. Pat. Nos. 7,876,456 and 7,990,522 (the '456 and '522 patents, respectively), which are hereby incorporated herein by reference in their entireties. As shown in FIG. 1, the CRS system 100 includes an optical element 120 and an electronics portion 160. It will be appreciated that the CRS system 100 shown in FIG. 1 is a chromatic point sensor system which measures a single measurement point at a time. The optical element 120 shown in FIG. 1 is an optical pen. However, in various embodiments, alternative types of chromatic range systems, such as a chromatic line sensor, may be configured to operate according to the systems and methods disclosed herein.

The optical pen 120 includes a fiber optic connector 109, a housing 131 (e.g., an assembly tube), and an optics portion 150. The fiber optic connector 109 is attached to the end of the housing 131. The fiber optic connector 109 receives an in/out optical fiber (not shown in detail) through a fiber optic cable 112 which encases it. The in/out optical fiber outputs source light through a fiber aperture 195 and receives reflected measurement signal light through the fiber aperture 195.

In operation, broadband (e.g., white) source light emitted from the fiber end through the fiber aperture 195 is focused by the optics portion 150, which includes a lens or lenses that provide an axial chromatic dispersion such that the focal point along the optical axis OA is at different distances depending on the wavelength of the light, as is known for chromatic confocal sensor systems. The source light forms a measurement beam 196 that includes a wavelength that is focused on a workpiece surface 190 at a position Z relative to the optical pen 120. Upon reflection from the workpiece surface 190, reflected light is refocused by the optics portion 150 onto the fiber aperture 195. The operative source light and reflected light are bounded by the limiting rays LR1 and LR2. Due to the axial chromatic dispersion, only one wavelength will have a front focus dimension FF that matches the measurement distance from the optical pen 120 to the surface 190. The optical pen is configured such that the wavelength that is best focused at the surface 190 will also be the wavelength of the reflected light that is best focused at the fiber aperture 195. The fiber aperture 195 spatially filters the reflected light such that, predominantly, the best focused wavelength passes through the fiber aperture 195 and into the core of the fiber optic cable 112. As described in more detail below and in the incorporated references, the fiber optic cable 112 routes the reflected signal light to a wavelength detector 162 that is utilized for determining the wavelength having the dominant intensity, which corresponds to the measurement distance to the workpiece surface 190.

FIG. 1 also schematically illustrates an optional reflective element 155 in dashed outline. As described in more detail in U.S. Patent Publication No. 20120050723, which is hereby incorporated by reference in its entirety, a reflective element may be placed in the path of the source beam SB. In such an implementation, rather than the measurement axis MA being coaxial with the optical axis OA, the reflective element may direct the measurement beam 196' along a measurement axis MA' in a different direction (e.g., orthogonal to the optical axis) as needed in some measurement applications. Such an orthogonal orientation is utilized in the embodiments illustrated in FIGS. 2 and 4A, as will be described in more detail below.

The electronics portion 160 includes a fiber coupler 161, the wavelength detector 162, a light source 164, a signal processor 166 and a memory portion 168. In various embodiments, the wavelength detector 162 includes a spectrometer or spectrograph arrangement wherein a dispersive optics portion (e.g., a grating) receives the reflected light through the fiber optic cable 112 and transmits the resulting spectral intensity profile to a detector array 163. The wavelength detector 162 may also include related signal processing (e.g., provided by the signal processor 166, in some embodiments) that removes or compensates certain detector-related error components from the profile data. Thus, certain aspects of the wavelength detector 162 and the signal processor 166 may be merged and/or indistinguishable in some embodiments.

The white light source 164, which is controlled by the signal processor 166, is coupled through the optical coupler 161 (e.g., a 2×1 optical coupler) to the fiber optic cable 112. As described above, the light travels through the optical pen 120 which produces longitudinal chromatic aberration so that its focal length changes with the wavelength of the light. The wavelength of light that is most efficiently transmitted back through the fiber is the wavelength that is in focus on the surface 190 at the position Z. The reflected wavelength-dependent light intensity then passes through the fiber coupler 161 again so that approximately 50% of the light is directed to the wavelength detector 162, which may receive a spectral intensity profile distributed over an array of pixels along a measurement axis of the detector array 163, and operate to provide corresponding profile data as described in more detail in the incorporated references. Briefly, a subpixel-resolution distance-indicating coordinate of the profile data (e.g., a peak position coordinate) is calculated by the signal processor 166, and the distance-indicating coordinate corresponding to the wavelength peak determines the measurement distance to the surface via a distance calibration lookup table which is stored in the memory portion 168. The distance-indicating coordinate may be determined by various methods such as determining the centroid of profile data included in a peak region of the profile data.

The optical pen 120 generally has a measurement range R that is bound by a minimum range distance ZMIN and a maximum range distance ZMAX. The measurement range R in some example instances of known optical pens may be approximately $1/10^{th}$ of the nominal standoff or working distance from the end of the pen (e.g., in the range of tens of microns to a few millimeters). FIG. 1 schematically illustrates that if the reflector element 155 is used, the measurement range R' may be directed along a measurement axis MA' determined by the placement of the reflector element 155 (e.g., the x-axis). In such a case, the measurement range R' may be bound by a minimum range distance XMIN and a maximum range distance XMAX.

It should be appreciated that the electronics portion 160 has conventionally been located away from the optical pen 120. It has been known to mount an optical pen analogous to the optical pen 120 shown in FIG. 1 on a CMM using a customized bracket, and to route an optical fiber analogous to the fiber optic cable 112 along a makeshift path on the outside of CMM components to remotely located electronics analogous to the electronics 160. This inadequate and inconvenient method has persisted for a number of years, as a desirable combination of features has not been provided that allows an automatically interchangeable CRS probe system. The use of CRS systems with CMMs has thus been limited.

As disclosed in more detail below with respect to FIGS. 2, 3A and 3B, in order to provide a desirable combination of features that provide a technically and economically attractive automatically interchangeable CRS probe system, certain components of the electronics portion 160 are desirable to include within a CRS probe assembly that is mated to a CMM through an autojoint connector. For example, in one implementation, a group of components in a light source and wavelength detector portion 160A (e.g., including the wavelength detector 162 and light source 164) may be included inside a CRS probe assembly. A group of components in a measurement signal processing and control circuit 160B (e.g., including the signal processor 166 and memory portion 168) may be located remotely outside of the CRS probe assembly, if desired (e.g., to maintain low probe weight and compact probe size).

Figure 2:
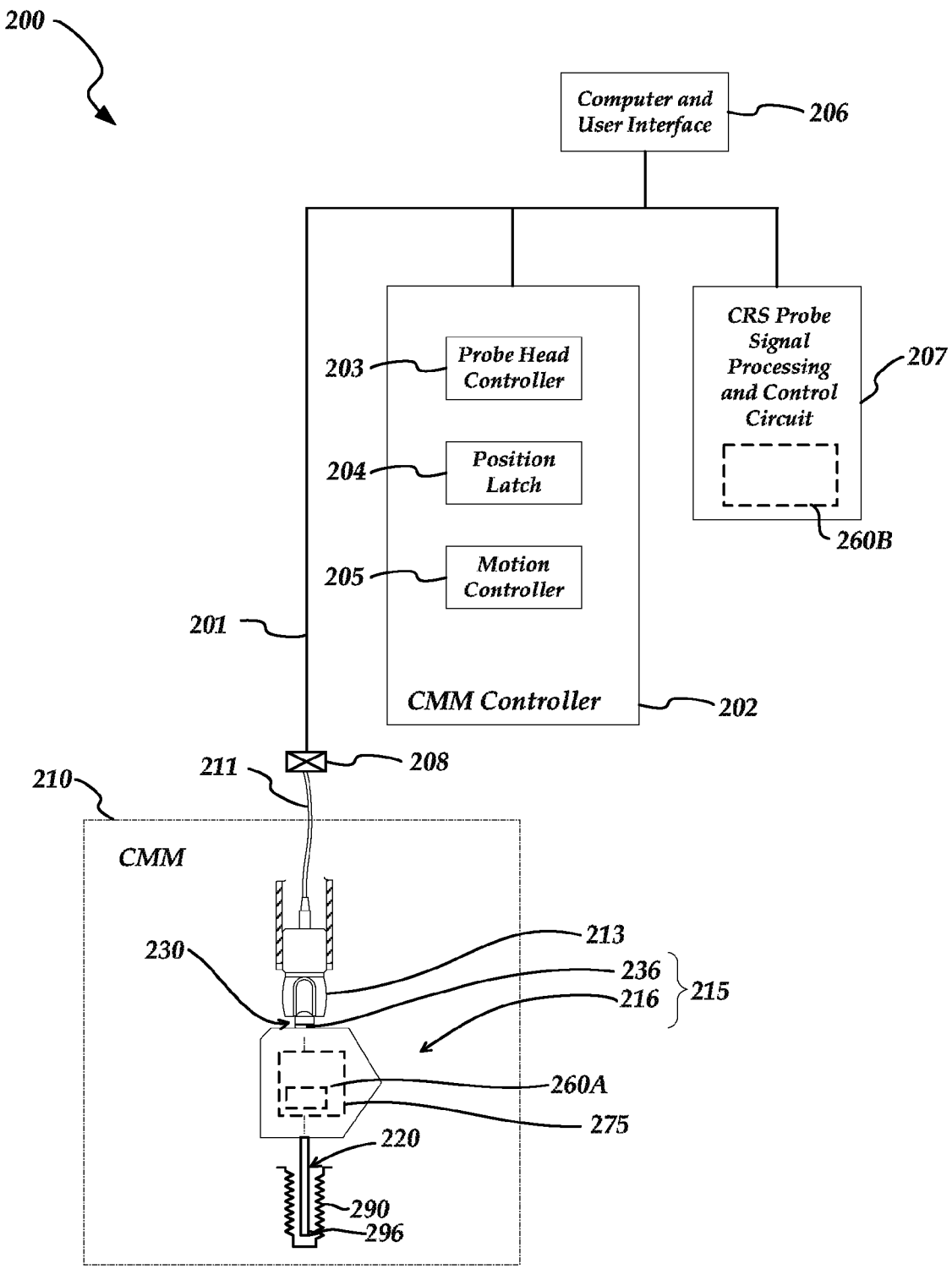
FIG. 2 is a block diagram of a coordinate measurement system including a coordinate measurement machine, a CRS probe including an optical pen, controllers, and a user interface.

FIG. 2 is a diagram of a coordinate measurement system 200, and an automatically connectable and interchangeable CRS probe system 215. That is, the CRS probe system 215 may be automatically interchanged with other types of CMM probes. A CRS probe system may also be referred to simply as a CRS probe herein. In various drawings herein, unless otherwise indicated by description or context, reference numbers having similar suffixes (e.g., reference number 1XX and 2XX having the suffix XX) may refer to generally analogous elements, such that operation of element 2XX may be generally understood by one of ordinary skill in the art with limited description, based on analogy to a previous description of analogous element 1XX, and so on. However, it will be understood that despite such analogy, various elements may have different implementations in different embodiments, as will be apparent to one of ordinary skill in the art, and are not limited to be identical.

The coordinate measurement system 200 includes a coordinate measurement machine controller 202, a computer and user interface 206, a probe signal processing and control circuit 207, and a coordinate measurement machine 210. The controller 202 includes a probe head controller 203, a position latch 204, and a motion controller 205. The CRS probe 215 includes an auto exchange joint element 236 and is connected to the coordinate measurement machine 210 through a mating joint element in the probe autojoint connection 230 (also referred to as an auto exchange joint connection).

The coordinate measurement machine 210 communicates with all of the other components through a data transfer line 201 (e.g., a bus), which is connected by a connector 208 (e.g., a "micro-D" type connector) to a probe head cable 211 which provides signals to and from the CRS probe 215. The coordinate measurement machine 210 is controlled by the coordinate measurement machine controller 202, while the CRS probe 215 exchanges data with, and is controlled by, the probe signal processing and control circuit 207 (e.g., in one embodiment, a probe signal processing and control circuit including measurement signal processing and control elements 260B, as outlined above with reference to the element 160B in FIG. 1). The user may control all of the components through the computer and user interface 206.

As outlined above, and described in more detail below with respect to FIGS. 3A and 3B, the CRS probe 215 includes a probe electronics 275 which includes a light source and wavelength detector portion 260A (e.g., in one embodiment, a light source and wavelength detector as outlined above with reference to the element 160A, in FIG. 1) and an optical pen 220 which directs a measurement beam 296 toward a measurement surface 290. In one specific example implementation, the measurement surface 290 may comprise an internal surface of a threaded hole. Such surfaces have been difficult or impossible to measure completely and reliably with known CMM probes (e.g., a touch probe). A CRS probe such as that disclosed herein is able to scan and measure such surfaces with improved completeness, accuracy and versatility.

As will be described in more detail below with respect to FIG. 5, in one embodiment, data related to the optical pen and/or interchangeable optics element (e.g., identification data, calibration data, compensation data, etc.) may be stored externally to the CRS probe 215 (e.g., in the probe signal processing and control circuit 207). In alternative implementations, portions of such data may be stored or otherwise encoded within portions of the CRS probe 215.

Figure 3A:
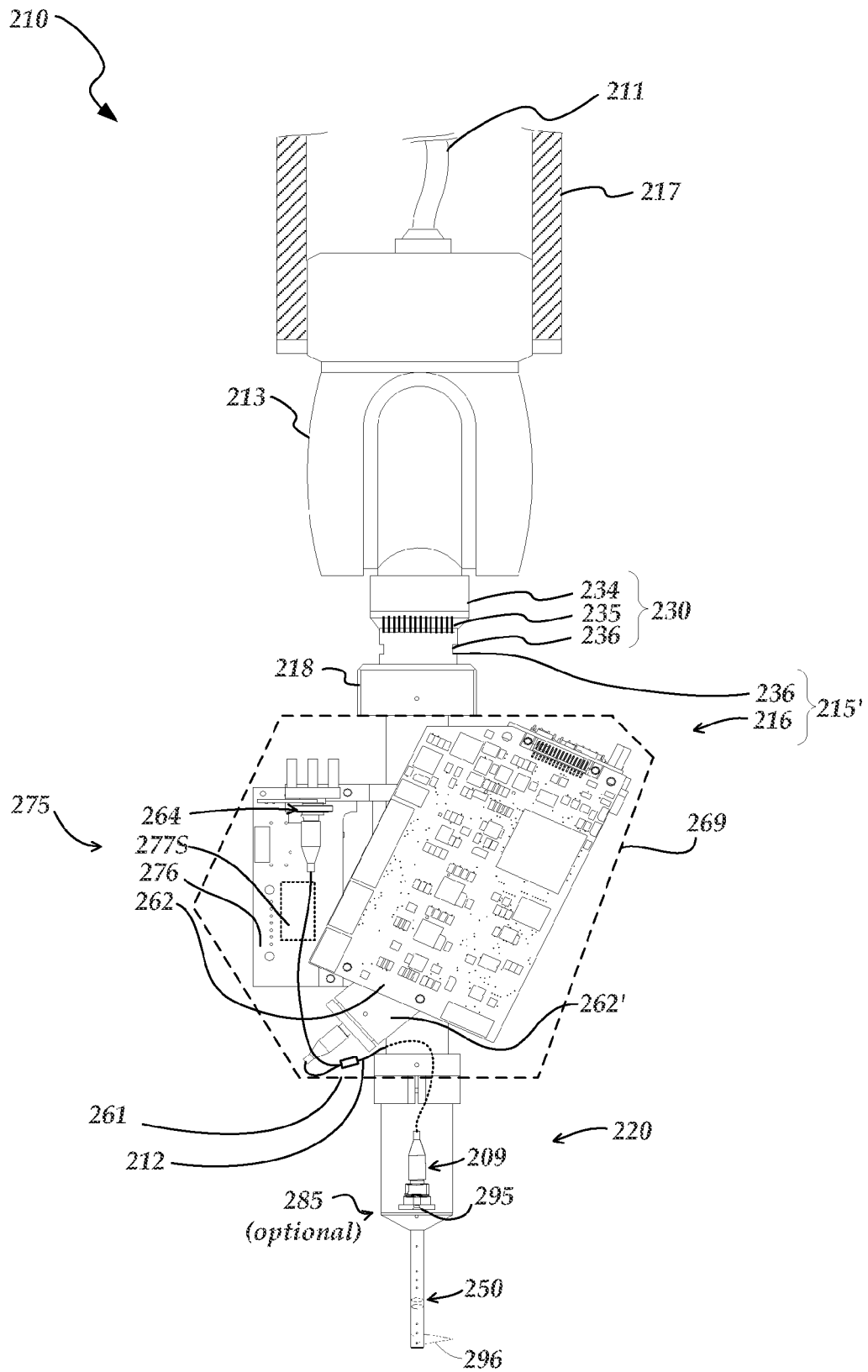
FIGS. 3A and 3B are diagrams illustrating the internal components of a first exemplary embodiment of the CRS probe of FIG. 2.
Figure 3B:
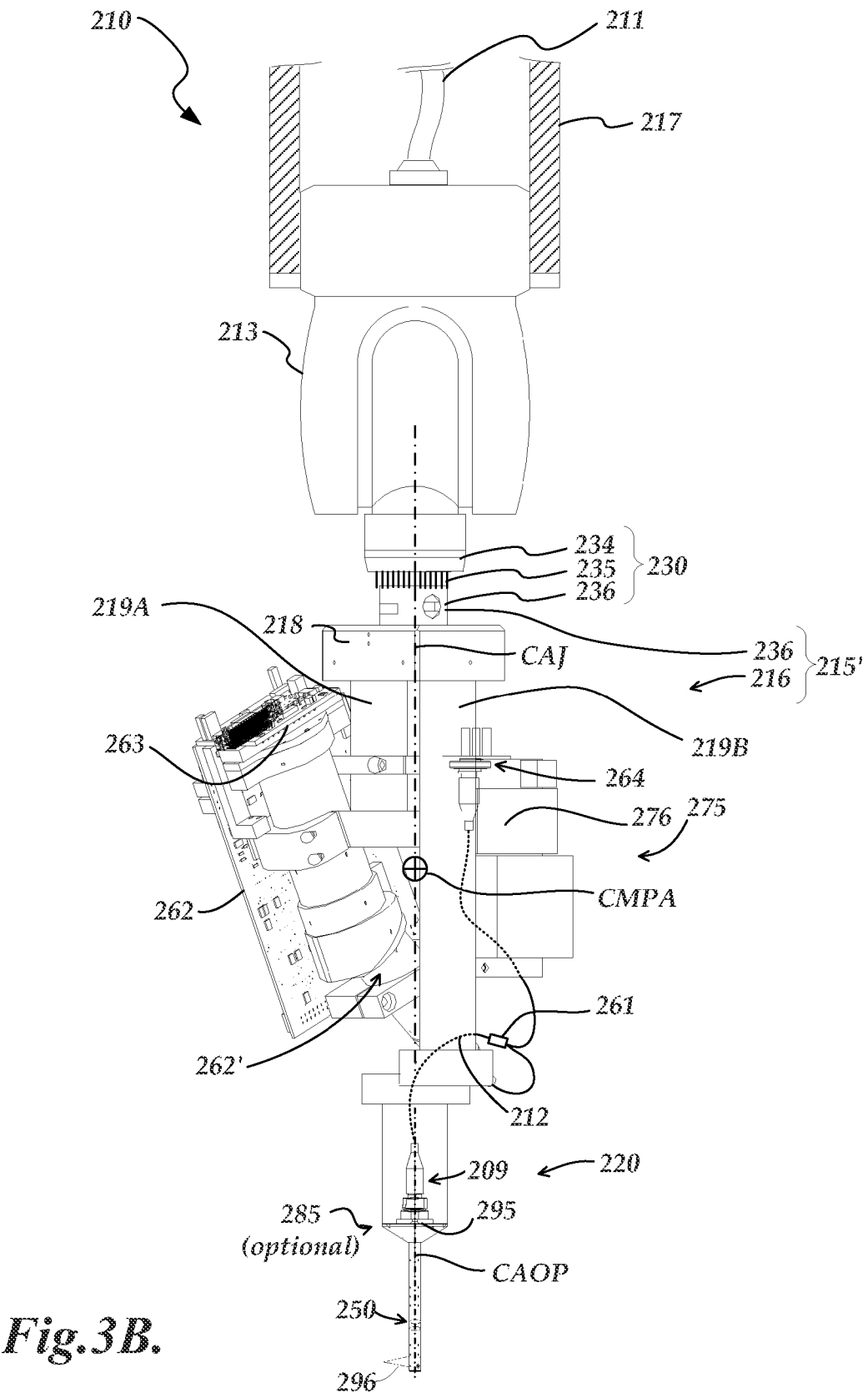

FIGS. 3A and 3B are diagrams schematically illustrating certain components of the coordinate measurement machine 210 and a CRS probe 215', which is similar to the CRS probe 215 of FIG. 2. FIG. 3A is a front view, and FIG. 3B is a view from a different angle of the coordinate measurement machine 210 and the CRS probe 215'. As shown in FIGS. 3A and 3B, the coordinate measuring machine 210 includes a probe head 213. The probe head 213 receives and transmits probe signals through the probe head cable 211. The probe head 213 is secured to a coordinate measurement machine quill 217. The probe head 213 is connected to the probe 215' at a probe autojoint connection 230 which will be described in more detail below with respect to FIG. 6.

The probe head 213 in some embodiments rotates in 360 degrees in a horizontal plane and contains a U-joint of any suitable type. The probe autojoint connection 230 is an electro-mechanical connection that fastens the probe head 213 rigidly and mechanically to the CRS probe 215', in a way such that it can be disconnected from one probe and attached to another. In one embodiment, the probe autojoint connection 230 may include first and second mating auto exchange joint elements 234 and 236, wherein the first auto exchange joint element 234 is mounted to the probe head 213, and the second mating auto exchange joint element 236 is mounted to the CRS probe 215'. In one embodiment, the probe autojoint connection 230 has mating electrical contacts or connections 235 so that when a probe is attached, the contacts automatically engage and make electrical connections. In some embodiments, this connection method can cause the system to have a relatively high amount of signal noise which, as will be described in more detail below, makes it advantageous to use certain configurations and methods which can function effectively in a relatively noisy environment.

The CRS probe 215' receives its power and control signals through the autojoint connection 230. The signals passed to the CRS probe 215' through the autojoint connection 230 are passed through connections 235, as will be described in more detail below with respect to FIG. 6. As shown in FIGS. 3A and 3B, the CRS probe 215' includes auto exchange joint element 236 and a probe assembly 216 that is mounted to the auto exchange joint element 236 for automatic connection to the CMM through the probe autojoint connection 230. The probe 215' may also include a protective cover or housing 269 (schematically illustrated). The probe assembly 216 comprises an optical pen 220, and probe electronics 275 which may comprise an electrically powered light source 264 and a wavelength detector 262, all supported by various structural members. In the embodiment shown in FIGS. 3A and 3B, the structural members extend from a base 218 that is attached to the auto exchange joint element 236. The optical pen 220 (analogous to the optical pen 120) may include a fiber optic connector 209, and a confocal optical path including an aperture 295 and chromatically dispersive optics portion 250, which outputs a measurement beam 296. In some embodiments, the optical pen 220 may include a repeatable fast exchange mount 285 which allows replacement of the chromatically dispersive optics portion 250, as described in greater detail below. The electrically powered light source 264 (e.g., a broad spectrum LED light source) may work in conjunction with known circuits (e.g., as found in commercial chromatic ranging systems) included in a probe power and signal control circuit portion 276 which is included in probe electronics 275, and which receives electrical power transmitted through the auto exchange joint element. In some embodiments, the probe electronics 275 includes a serializer 277S that allows various data signals to be serialized and communicated through the autojoint connection 230 using relatively few wires to a deserializer (included, for example, in the probe signal processing and control circuit 207), as described in greater detail below. In the embodiment shown in FIG. 3A, the serializer 277S is included on the probe power and signal control circuit portion 276. However, in other embodiments, the serializer 277S may be included with the CRS wavelength detector 262, since much of the serialized data to be transmitted is measurement spectral profile data that originates in the CRS wavelength detector 262. More generally, the serializer 277S may be located at any desired location in the probe electronics 275 that provides satisfactory noise and crosstalk characteristics.

The light source 264 generates light originating in the CRS probe assembly, the light comprising an input spectral profile of wavelengths routed to the optical pen 220 through the optical fiber 212. The CRS wavelength detector 262 may comprise known circuits (e.g., as found in commercial chromatic ranging systems) that work in conjunction with a spectrometer arrangement 262' and detector array 263 comprising a plurality of pixels distributed along a measurement axis of the CRS wavelength detector, the plurality of pixels receiving respective wavelengths reflected into the confocal optical path from the target surface and providing output spectral profile data.

It will be appreciated that a configuration such as that outlined above which generates and processes the light used for measurement entirely within the CRS probe assembly allows the CRS probe assembly to be self-contained and automatically exchangeable. In various embodiments, such a CRS probe system does not require or include an optical fiber connection from the CRS probe assembly to an outside element through the autojoint connector, or along any other makeshift path in parallel with the autojoint connector. Stated another way, in various embodiments, such a CRS probe assembly does not connect to or include an optical fiber that extends outside of the CRS probe assembly.

In various embodiments, the CRS probe assembly is configured such that the optical pen is mounted at a distal end of the CRS probe assembly. In the embodiment shown in FIGS. 3A and 3B, the CRS probe assembly 215' includes the base portion 218, a wavelength detector mounting portion 219A coupled to the base portion 218, and an optical pen mounting portion 219B coupled to the base portion and carrying the optical pen without carrying the wavelength detector, which may isolate heat and mass-related deflection and vibration away from the optical pen. In some embodiments, one or both of the mounting portions 219A and 219B may comprise a hollow structural tube (e.g., a carbon fiber tube) that extends away from the base portion and toward the distal end of the CRS probe assembly.

In one embodiment, the center of mass of the optical pen 220 is located proximate to an axis defined by the center of mass CMPA of the rest of the CRS probe 215' and the center axis CAJ of the probe autojoint connection 230. Such a configuration may provide for smoother operation of the probe head 213 as it is utilized to move the CRS probe 215' (e.g., avoiding unnecessary additional torque, vibration, deflection, etc.). In one implementation, the optical pen 220 may also be mounted relative to the probe autojoint connection 230 such that the central axis CAOP (e.g., a reference axis for measurements) of the optical pen 220 is coaxial with the central axis CAJ of the auto exchange joint 230. In such a configuration, when the CMM rotates the probe autojoint connection 230 around its axis, the optical pen 220 may also be rotated around its axis with no lateral movement of the measurement reference axis in a X-Y plane. Such a configuration may provide certain advantages (e.g., being mechanically more stable, simplifying the calculation of the location of the measurements taken with the optical pen 220 relative to the positioning by the CMM, etc.).

Figure 4A:
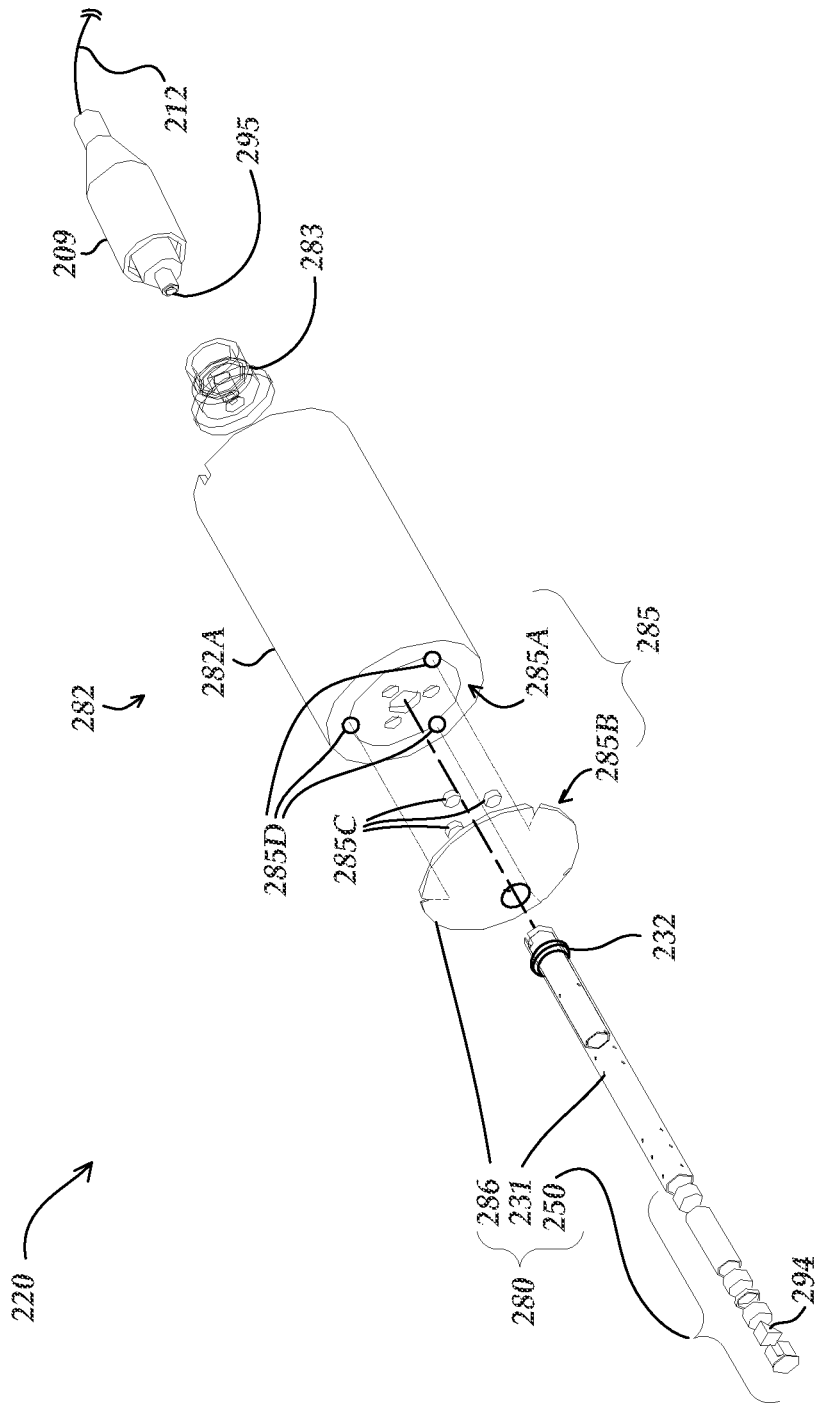
FIGS. 4A and 4B are diagrams illustrating the components of the optical pen including the repeatable fast exchange mount and the interchangeable optics element of FIGS. 3A and 3B.
Figure 4B:
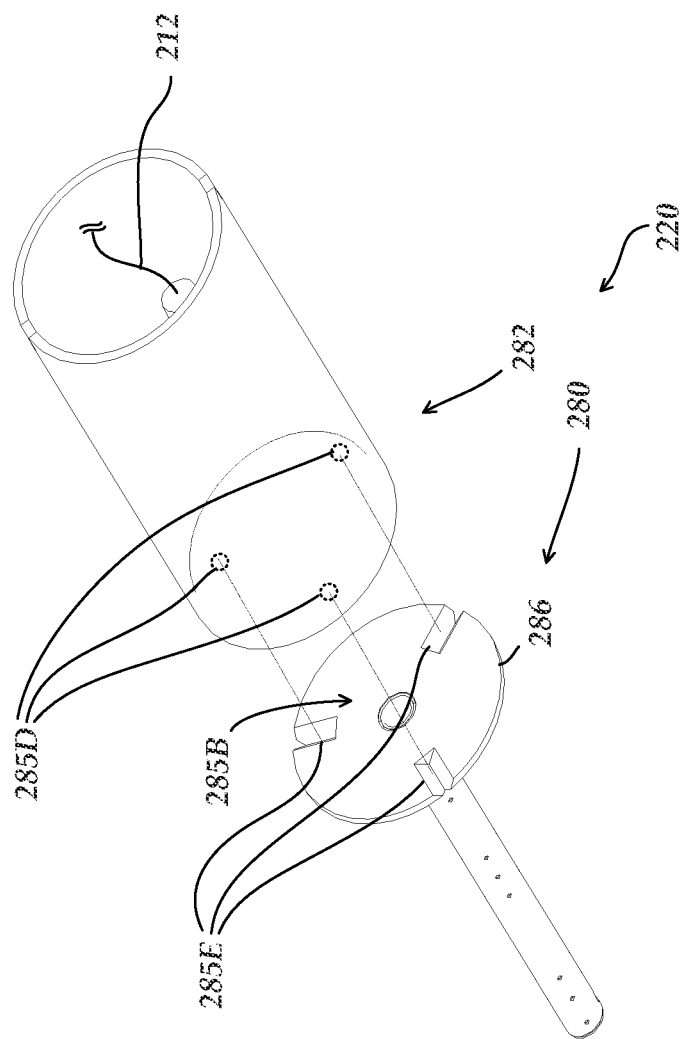

FIGS. 4A and 4B are diagrams illustrating components of the optical pen 220 of FIGS. 3A and 3B, for an embodiment that includes an exemplary repeatable fast exchange mount 285. In the embodiment shown in FIGS. 4A and 4B, the optical pen 220 includes a base member 282 and an interchangeable optics element 280. The interchangeable optics element 280 includes a front plate 286, tube 231, and chromatically dispersive optical portion 250. The base member 282 includes a base housing 282A which includes a surface which serves as a first mating half 285A of the repeatable fast exchange mount 285, and the front plate 286 has a corresponding surface which serves as a second mating half 285B of the repeatable fast exchange mount 285. In one embodiment, the second mating half 285B of the repeatable fast exchange mount 285 is forced against the first mating half 285A by a holding force arrangement comprising permanent magnets 285C mounted in one or both of the first and second mating halves 285A or 285B. More generally, the holding force arrangement may comprise known means such as spring-loaded mechanical detents, or the like. With such a configuration, the second mating half 285B may be automatically connected to and separated from the first mating half 285A under program control (e.g., as controlled by the computer and user interface 206). For example, in one embodiment, the optical pen may include a collar 232 or the like which may be guided under program control such that it is inserted between the arms of a mating fork included on a probe rack within the motion volume of a CMM. The CMM may then move the CRS probe 215' such that the arms of the fork bear on the collar 232 and force the mating halves of the repeatable fast exchange mount 285 apart, leaving the interchangeable optics element 280 hanging in the probe rack. The interchangeable optics element 280 may be mounted back to the base member 282 by the reverse of these operations. In addition, with such a configuration, in the event of a lateral collision with a workpiece, the interchangeable optics element 280 will separate from the base member 282, rather than being damaged.

In one embodiment, the repeatable fast exchange mount 285 may comprise three spheres or balls 285D which are fixed in the first mating half 285A in a first triangular pattern (e.g., an equilateral triangle), and three radially oriented V-grooves 285E which are fixed in the second mating half 285B in a mating pattern. Such an embodiment of the repeatable fast exchange mount 285 allows the interchangeable optics element 280 to be mounted with the laterally oriented measurement beam 296 facing in any of three different orientations spaced 120 degrees apart. However, it will be appreciated that such an embodiment is exemplary only, and not limiting. Various other repeatable fast exchange mounting configurations may be used, provided that adequate mounting repeatability is provided, as is generally known in the art.

The interchangeable optics element 280 includes the chromatically dispersive optical portion 250 (e.g., analogous to the chromatically dispersive optical portion 150 described above with respect to FIG. 1). In one embodiment, the base member 282 includes the end of an optical fiber 212 that is connected to the LED light source 264 and to the spectrometer arrangement 262' through a fiber connector 261. The end of optical fiber may be located proximate to a confocal aperture 295 that is fixed relative to the first mating half 285A of the repeatable fast exchange mount 285, which may generally surround the confocal aperture 295. In some embodiments, the end of the optical fiber provides the confocal aperture. In some embodiments, the confocal aperture 295 is provided by a thin aperture that is bonded in place proximate to or abutting the end of the optical fiber (e.g., on a holder or connector that holds the optical fiber). In the embodiment shown in FIG. 4A, the base member 282 includes an optical fiber end positioning arrangement 283 comprising an optical fiber-holding element (e.g., a fiber optic connector that mates with the connector 209, in this embodiment) that is fixed (e.g., bonded) in the base member 282 proximate to the first mating half 285A of the repeatable fast exchange mount 285. In this embodiment, the optical fiber end positioning arrangement 283 may comprise an optical fiber-holding element that holds the optical fiber (e.g., through the connector 209) and fixes the end of the optical fiber and the confocal aperture 295 relative to the first mating half 285A of the repeatable fast exchange mount 285. However, in other embodiments, the confocal aperture may be separately fixed to the base member 282 and the end of the optical fiber may be fixed proximate to that confocal aperture by a suitable optical fiber end positioning element, if desired, as described in greater detail below.

The interchangeable optics element 280 receives measurement light from, and returns measurement light to, the confocal aperture 295, and provides axial chromatic dispersion of the measurement light over a respective measuring range along a measuring axis. In one embodiment, the chromatically dispersive optical portion 250 may also include a reflective element 294, which directs the measurement beam laterally to the axis of the optical pen 220 (e.g., laterally relative to the axis of the tube 231).

Figure 5:
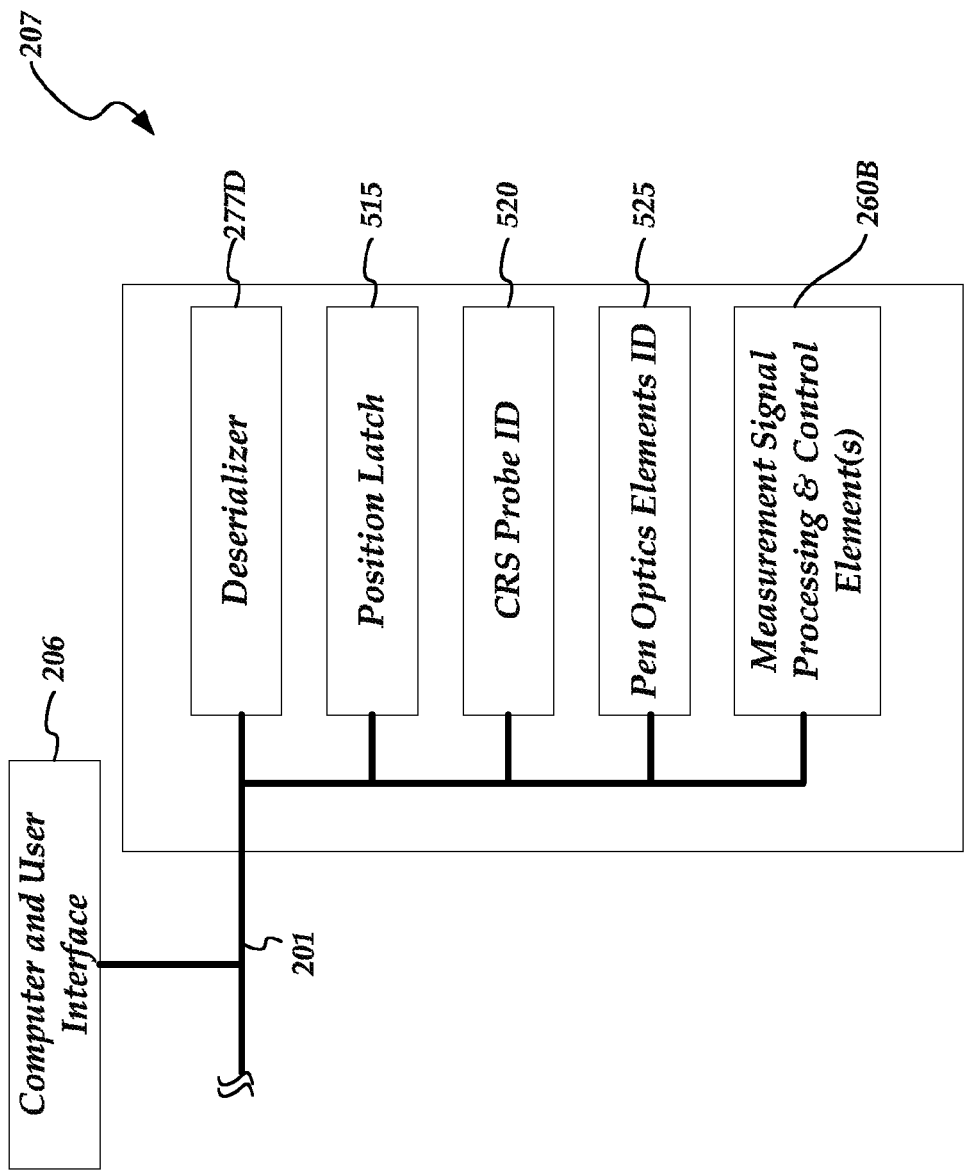
FIG. 5 is a block diagram illustrating the components of the probe controller of FIG. 2.

FIG. 5 is a block diagram of one embodiment of the computer and user interface 206 and the probe signal processing and control circuit 207 of FIG. 2. As shown in FIG. 5, the probe signal processing and control circuit 207 may include a deserializer 277D, a position latch 515, a CRS probe ID 520 and an optical pen ID 525. The components of the probe signal processing and control circuit 207 are coupled to one another and to the computer and user interface 206 by the data transfer line 201.

The deserializer 277D may work in conjunction with the serializer 277S shown in FIG. 3A to allow various data signals to be serialized and communicated through the autojoint connection 230 using relatively few wires. The serializer 277S and a deserializer 277D are related to the utilization of certain low voltage differential signaling (LVDS) that may be used in some embodiments, as will be described in more detail below with respect to FIG. 7. Briefly, a synchronization signal is provided between a serializer and a deserializer in order to ensure that they are synchronized. On the corresponding signal lines, clock signals are provided until the deserializer is finished, at which point the synchronization signal is switched, after which the relevant data signals are provided on the signal lines (e.g., as opposed to the previous clock signals).

The position latch 515 relates to an XYZ latch signal that will be described in more detail below with respect to FIG. 7. Briefly, an XYZ latch signal is provided for synchronizing the measurement positioning of the CRS probe with the measurement positioning of the coordinate measurement machine controller 202 (as depicted, for example, in FIG. 2). In one embodiment, the position latch 515 communicates with the position latch 204 in the coordinate measurement machine controller 202 in order to ensure that the coordinates of the coordinate measurement machine 210 are properly synchronized. In other words, the position latch 515 and the position latch 204 combine to ensure the accuracy of the overall derived measurements, such that the CMM machine coordinates (which reflect the position of the CRS probe during a particular measurement) are properly combined with the CRS probe measurements (which are relative to the CRS probe position).

The CRS probe ID 520 is utilized for determining the identification of the CRS probe 215' (e.g., by reading and processing an identification signal derived from an identifying element included in the CRS probe 215'), and the optics elements ID 525 is utilized for determining the identification of the interchangeable optics element 280 (e.g., by reading and processing an identification signal derived from an identifying element included in the interchangeable optics element 280). The proper identification of the CRS probe 215' and the interchangeable optics element 280 allow proper configuration and calibration data to be utilized in order to ensure accurate operations and resulting measurements from the CRS probe 215' and interchangeable optics element 280.

Figure 6:
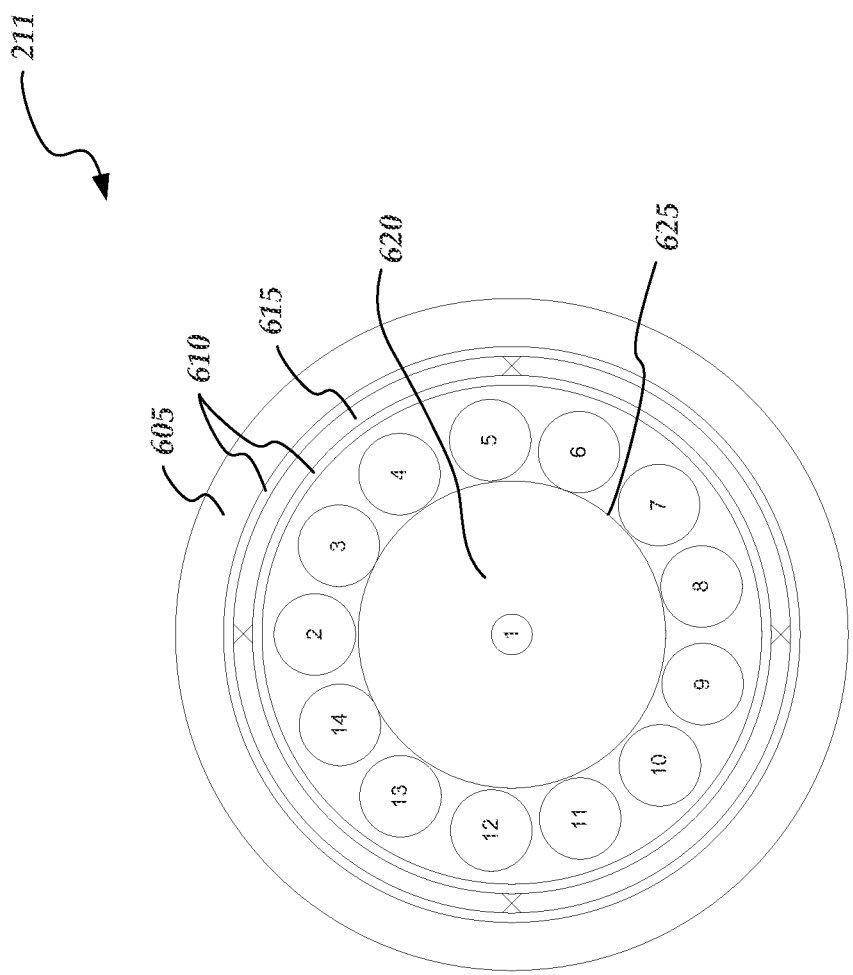
FIG. 6 is a diagram illustrating a cross section of the probe data cable of FIG. 2.

FIG. 6 is a diagram illustrating a cross section of the probe head cable 211 of FIG. 2. As shown in FIG. 6, the probe head cable 211 includes a sheath 605, sealing tape layers 610, an electrical outer shield layer 615, and a coaxial cable 620 including a central conductor 1 and an inner shield layer 625. Additional conductors 2 through 14 are shown as surrounding the coaxial cable 620, in accordance with a conventional Renishaw™ configuration, as will be described in more detail below with respect to FIG. 7.

Figure 7:
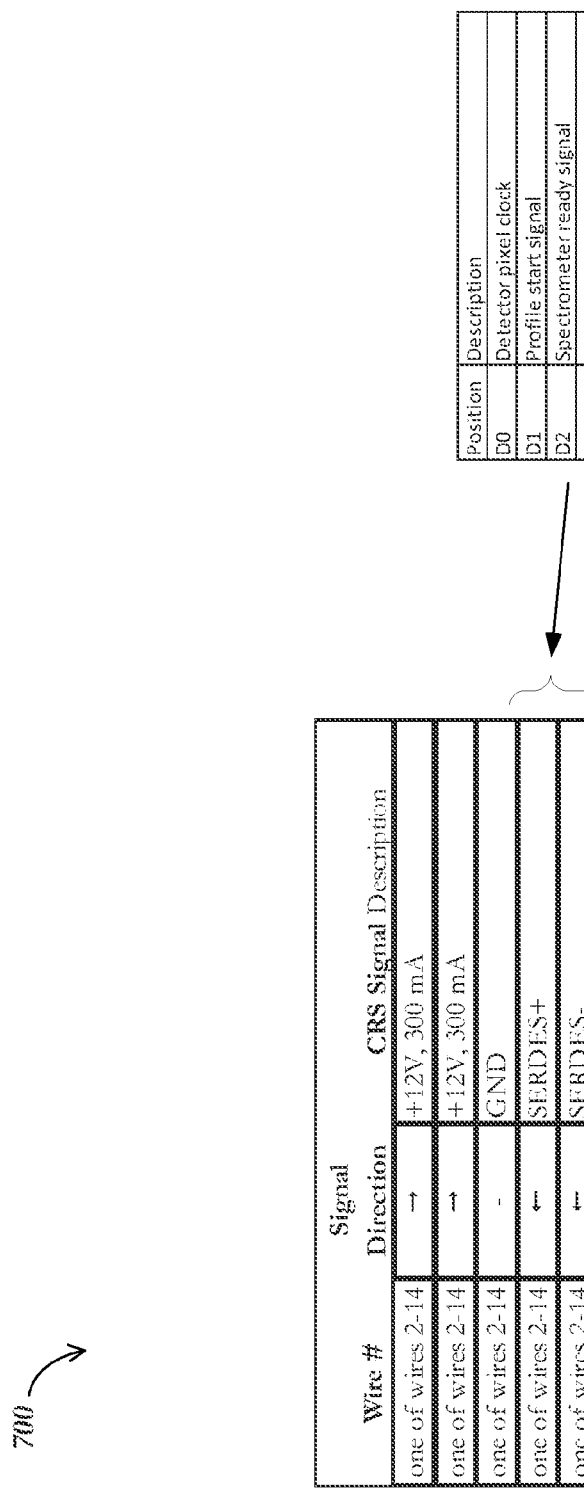
FIG. 7 is a table outlining one exemplary connection and/or signal scheme usable with the connection pins of an autojoint connection and the cable of FIG. 6.

FIG. 7 is a table 700 outlining one exemplary connection and/or signal scheme usable with the probe head cable 211 of FIG. 6 and/or the autojoint connection 230 shown in FIGS. 3A and 3B. The connection numbers in the "Wire #" column indicate the wire number of the cable 211 that is connected to an autojoint pin (e.g., one standard Renishaw™ autojoint connection configuration), unless otherwise indicated.

As shown in the table 700, in this embodiment, power and signal ground connections, the low voltage differential signaling (LVDS) serializer signals SERDES+, SERDES- and SERDES block/sync, a CRS signal for the spectrometer/detector reset, and CRS control clock and data signals (e.g., $I^2C$ clock and data signals) may be provided on the various wires and connected autojoint pins. It will be appreciated that a plurality of wires may be used in combination to provide power to the CRS CMM probe, in order to meet certain standard autojoint and/or CMM controller design requirements (e.g., not providing more than 300 mA through any single conductor). For example, using two wires at 12 V, 300 mA each provides the capability of delivering 7.2 watts within standard autojoint and/or CMM controller specifications.

In general, the various signals may be routed on any suitable wire and/or autojoint pin. The serializer signals SERDES+, SERDES- are carried on lines/pins that connect the deserializer 277D and serializer 277S. Experiment and/or analysis may be used to select and/or verify the connections that provide reliable signal transmission. In various embodiments it may be particularly advantageous for the inner shield and outer shields to be connected to CRS ground, and the wire number COAX/1 used to carry the CRS detector signal(s) (i.e., the output spectral profile data or measurement signals, which may comprise spectrometer pixel value signal(s)) as indicated in the embodiment shown in FIG. 7. It will be appreciated that in a CRS system, it is relatively important that the spectrometer signals receive minimal distortion or additional noise. By utilizing the COAX portion (i.e., wire number 1) of the cable 211, minimal signal degradation results, thus providing a reliable means for transmitting the spectrometer signal.

With regard to the LVDS serializer signals SERDES+, SERDES−, they may be carried on two wires with a third wire carrying an associated ground, and the SERDES lock/sync signal may be carried on an additional wire. With regard to the serialization sequence, in one embodiment a position D0 is designated as being for the detector pixel clock. A position D1 is designated as being for the profile start signal for the spectral profile measurement data. A position D2 is designated as being for the spectrometer ready signal. The position D3 is designated as being for the XYZ latch signal (e.g., as described in more detail above with respect to the position latch 515 of FIG. 5). A position D4 is designated as being for a detector temperature alarm. The position D5 is designated as being for a spectrometer temperature alarm. The positions D6-D9 are not yet designated and thus are not specifically assigned in this embodiment.

With regard to the speed of the LVDS serialization, in one specific example implementation, the fastest available digital signal may be utilized (e.g., a detector pixel clock signal at several MHz). The serializer may then sample the digital signals at a relatively fast rate (e.g., two times the detector pixel clock rate). In one embodiment, the LVDS serializer may sample up to 10 digital signals per sample cycle. The serializer may then transmit the combined signals at a much faster rate (e.g., 2 times the detector pixel clock rate times <10 digital signals+2 synchronization bits>), which may provide a bit rate of more than 100 MHz, in some embodiments.

It will be appreciated that the above-described utilization of a low voltage differential signaling (LVDS) serializer is particularly advantageous where a limited number of connections are available in a standard autojoint connector. In other words, the standard autojoint connector only provides a limited number of connections (e.g., 13 pins). In contrast, a standard CRS system may utilize significantly more conductors, such as between the controller and the spectrometer (e.g., 24 conductors). The conductor count can be reduced in part by avoiding non-crucial signals. However, for the remaining signals, the LVDS serializer technique allows more signals to be provided to the controller board using only two signal lines, as described above with respect to FIG. 7.

Such LVDS serialization techniques may provide at least three or more distinct signals over two connections/conductors through the auto exchange joint element, and in some embodiments up to 10 digital signals or types of information using only two conductors through the auto exchange joint element. The signals are made to be robust, in that the differential signals ignore common mode noise. The technique may be implemented with low power (e.g., in one specific example embodiment the signals may be sent at +/−500 mV with a 1V offset), which is important in a CMM probe application. A high speed can be achieved (e.g., a range of 100 MHz to GHz operation). The signals may travel over relatively long wires (e.g., multiple meters of wire when proper termination is utilized). In one embodiment, the LVDS serialization techniques may be implemented using a SN65LV1023 serializer and SN67LV1224 deserializer from Texas Instruments of Dallas, Tex., USA. The signaling protocol outlined above, or other known LVDS signaling protocols, may be used.

Figure 8:
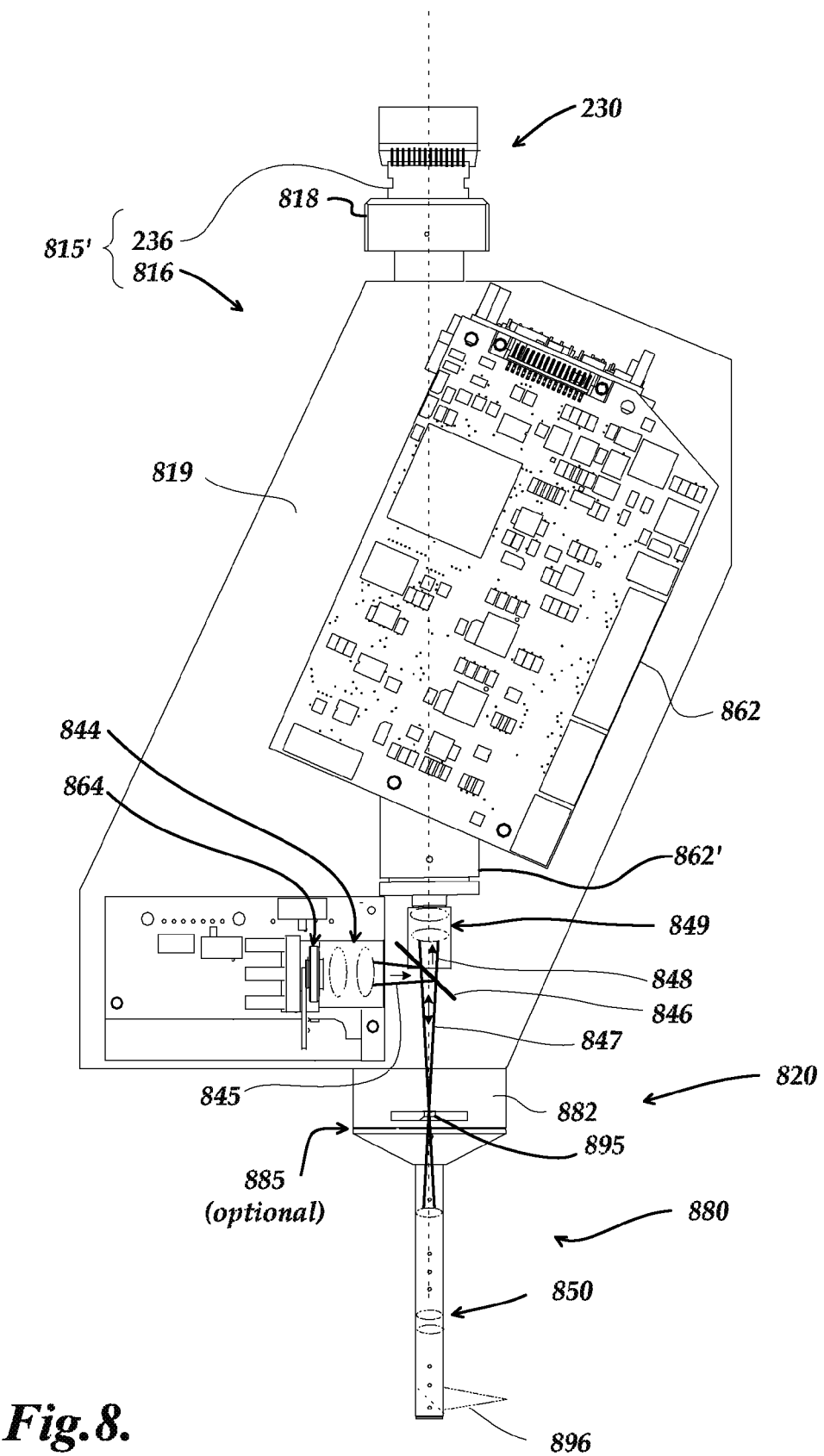
FIG. 8 is a diagram schematically illustrating optical paths usable in a second exemplary embodiment of the CRS probe of FIG. 2 in which the light used in the CRS probe assembly propagates through optical elements in free space rather than through a fiber.

FIG. 8 is a diagram schematically illustrating components and optical paths usable in a second exemplary embodiment of the CRS probe of FIG. 2 in which the light used in the CRS probe assembly propagates in free space through optical elements mounted in a fixed relationship, rather than through an optical fiber.

As shown in FIG. 8, the CRS probe 815' includes auto exchange joint element 236 and a probe assembly 816 that is mounted to the auto exchange joint element 236, for automatic connection to the CMM through the probe autojoint connection 230. The probe 815' may also include a protective cover or housing (not shown). The probe assembly 816 comprises an optical pen 820, an electrically powered light source 864, and a wavelength detector 862 supported by a frame 819 which may include various structural members, and which may extend from a base 818 that is attached to the auto exchange joint element 236. The frame 819 holds the various elements outlined above, as well as a set of optical path elements (e.g., lenses, a beamsplitter, etc.), in a fixed relationship that provides the desired optical path for the light used in the probe assembly 816. The optical pen 820 (analogous to the optical pen 220) may include a confocal optical path including an aperture 895 and chromatically dispersive optics portion 850, which outputs a measurement beam 896. In some embodiments, the optical pen 820 may include a repeatable fast exchange mount 885 which allows replacement of the chromatically dispersive optics portion 850, as outlined above in relation to the repeatable fast exchange mount 285.

In operation, the electrically powered light source 864 receives electrical power transmitted through the auto exchange joint element and generates light originating in the CRS probe assembly, the light comprising an input spectral profile of wavelengths. In the embodiment shown in FIG. 8, the input spectral profile is output through light source optics 844 which may provide a focused and/or shaped input beam 845. The input beam 845 is reflected at a beam splitter 846 along the beam path 847 to confocal aperture 895 of the optical pen 820. The optical pen transmits and outputs corresponding radiation to the workpiece surface in the measurement beam 896 and receives reflected radiation from the workpiece surface and outputs reflected radiation from the confocal aperture 895 back along the beam path 847 and through the beamsplitter 846 to provide an output spectral profile 848 to the spectrometer input optics 849 and to the spectrometer 862' of the CRS wavelength detector 862. The output spectral profile comprises a distance-dependent profile component having a wavelength peak that indicates a measurement distance from the optical pen to the workpiece surface, and the CRS wavelength detector provides corresponding output spectral profile data (e.g., output by electrical signals through the through the probe autojoint connection 230) according to previously outlined principles of operation for a CRS probe.

Similarly to the previously described embodiments that include optical fiber light paths in the CRS probe assembly, it will be appreciated that a configuration such as that outlined above which generates and processes the light used for measurement entirely within the CRS probe assembly allows the CRS probe assembly 815' to be self-contained and automatically exchangeable (e.g., exchangeable with other types of CMM probes using a CMM machine control program). In various embodiments, such a CRS probe system does not require or include an optical fiber connection from the CRS probe assembly to an outside element through the autojoint connector, or along any other makeshift path in parallel with the autojoint connector. Stated another way, in various embodiments, such a CRS probe assembly does not connect to or include an optical fiber that extends outside of the CRS probe assembly.

In some embodiments, the center of mass of the optical pen 820 may be located proximate to an axis defined by the center of mass of the rest of the CRS probe 815' and the center axis of the probe autojoint connection 230. In one implementation, the optical pen 820 may also be mounted relative to the probe autojoint connection 230 such that the central axis of the optical pen 220 is coaxial with the central axis of the probe autojoint connection 230. In some embodiments, the optical pen 820 may include a repeatable fast exchange mount 885, which may be designed according to previously outlined principles, for example, including a base member 882 and an interchangeable optics element 880.

Figure 9:
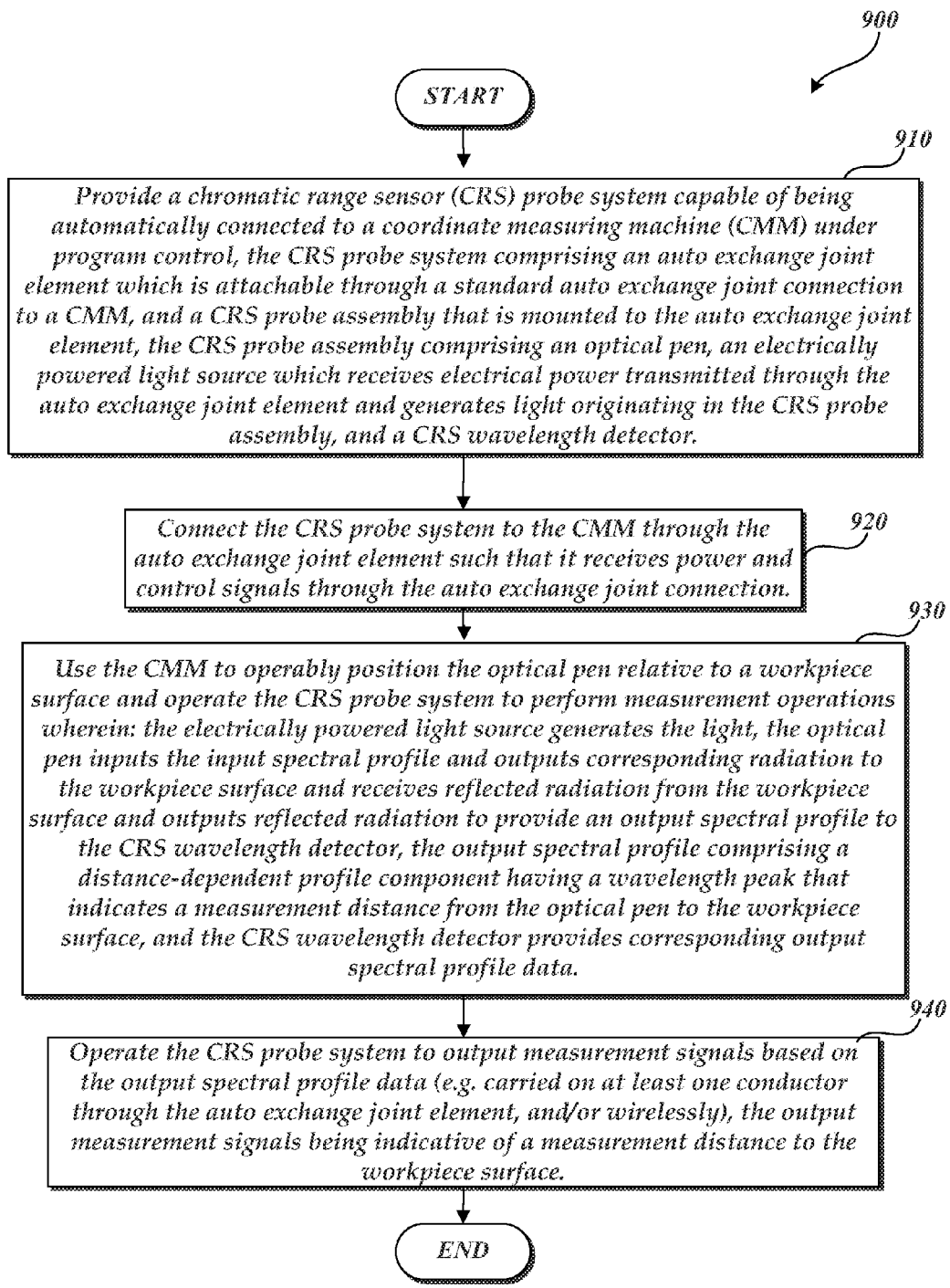
FIG. 9 is a flow diagram illustrating one exemplary embodiment of a routine for providing and operating an automatically interchangeable CRS probe system on a CMM.

FIG. 9 is a flow diagram illustrating one exemplary embodiment of a routine 900 for providing and operating an automatically interchangeable CRS probe system embodiment as disclosed herein. At a block 910, a CRS probe system is provided that is capable of being automatically connected to a CMM under program control. The CRS probe system includes an auto exchange joint element which is attachable through a standard auto exchange joint connection to a CMM, and a CRS probe assembly that is mounted to the auto exchange joint element for automatic connection to the CMM through the auto exchange joint element. In various embodiments, such a CRS probe system does not require or include an optical fiber connection from the CRS probe assembly to an outside element through the autojoint connector, or along any other makeshift path in parallel with the autojoint connector. The CRS probe assembly includes an optical pen, an electrically powered light source which receives electrical power transmitted through the auto exchange joint element and generates light originating in the CRS probe assembly, and a CRS wavelength detector. As outlined previously, in various embodiments, the optical pen comprises a confocal optical path including a chromatically dispersive optics portion, the optical pen configured to focus different wavelengths at different distances along a measurement axis proximate to a workpiece surface to be measured. The light originating in the CRS probe assembly comprises an input spectral profile of wavelengths routed to the optical pen. The CRS wavelength detector comprises a plurality of pixels distributed along a measurement axis of the CRS wavelength detector, the plurality of pixels receiving respective wavelengths and providing output spectral profile data.

At a block 920, the CRS probe system, as connected to a CMM through the auto exchange joint element and power and control signals, are provided to the CRS probe assembly through the auto exchange joint connection.

At a block 930, using the CMM, the optical pen is operably positioned relative to a workpiece surface, and the CRS probe system is operated to perform measurement operations wherein: the electrically powered light source generates the light, the optical pen inputs the input spectral profile and outputs corresponding radiation to the workpiece surface and receives reflected radiation from the workpiece surface, and outputs reflected radiation to provide an output spectral profile to the CRS wavelength detector. The output spectral profile comprises a distance-dependent profile component having a wavelength peak that indicates a measurement distance from the optical pen to the workpiece surface. The CRS wavelength detector provides corresponding output spectral profile data as part of the measurement operations. At a block 940, the CRS probe assembly is operated to output measurement signals based on the output spectral profile data, wherein the output measurement signals are indicative of a measurement distance to the workpiece surface. In some embodiments, the output spectral profile data as provided by the pixel values of a detector array included in the wavelength detector are the output measurement signals. However, in other embodiments, the output measurement signals may be signals derived from the measured spectral profile data (e.g., compensated signals, or a determined wavelength peak value, or a final distance measurement derived therefrom, or the like). In various embodiments, the output measurement signals are carried on at least one conductor through the auto exchange joint element. In some embodiments, some or all of the signals may be wirelessly transmitted and bypass the probe autojoint connection. It will be appreciated that a feature of the CRS probe configurations disclosed herein that allows them to be self-contained and automatically exchangeable with other types of probes (e.g., on a CMM) is that they are configured to generate and process the light used for measurement entirely within the CRS probe assembly.

Figure 10:
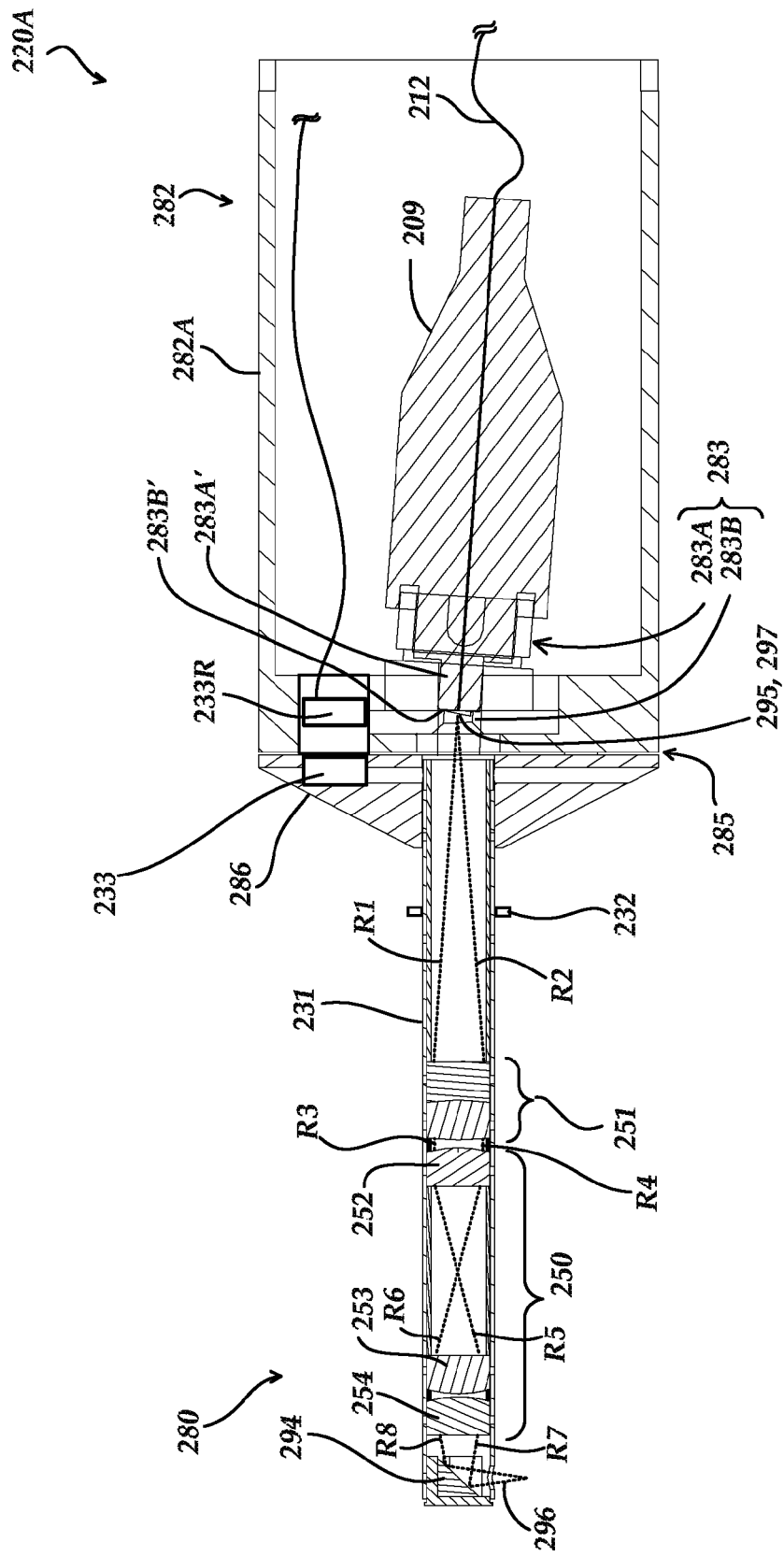
FIG. 10 is a diagram illustrating additional details of the components of an exemplary embodiment of an optical pen similar to the optical pen of FIGS. 4A and 4B.

FIG. 10 is a diagram illustrating the components of an exemplary embodiment of an optical pen 220A similar to the optical pen 220 of FIGS. 4A and 4B. Certain of the components of FIG. 10 are shown in greater detail, particularly with respect to the optical elements and the location of the optical fiber, as will be described in more detail below. As shown in FIG. 10, the optical pen 220A includes a base member 282 and an interchangeable optics element 280, which are coupled together by an exemplary repeatable fast exchange mount 285. In this embodiment, the interchangeable optics element 280 includes a front plate 286, tube 231, chromatically dispersive optical portion 250, and a transfer lens 251.

In one embodiment, the interchangeable optics element 280 may include an ID element 233 (mounted to the front plate 286, for example). A corresponding reader element 233R may be located in the optical pen base member 282. The ID element 233 may be encoded with particular identification information for the interchangeable optics element 280. The ID element 233 may in one embodiment comprise a radio frequency identification device (an RFID element), which may be a passive RFID element. The reader element 233R (e.g., an RFID reader element) is located in close enough proximity to be able to read the data from the ID element 233. In some embodiments, if the reader element 233R is not located adjacent to the ID element 233, a hole may be provided in the base member 282 so that the material of the base member does not obstruct the exchange of signals between the ID element 233 and the reader element 233R (e.g., radio signals, optical signals, an optical image, etc.). In some embodiments, the ID element 233 may comprise an identifying mark (e.g., a simple bar code) or color(s) and the reader element 233R may comprise a photodetector that provides a signal corresponding to the identifying mark or color(s). In some embodiments, the ID element 233 may comprise a passive resonant circuit having an identifying frequency and the reader element 233R may comprise an exciter/detector that provides a signal in response to the identifying frequency.

The base member 282 includes a base housing 282A which includes a surface which serves as a first mating half of the repeatable fast exchange mount 285, and the front plate 286 has a corresponding surface which serves as a second mating half of the repeatable fast exchange mount 285. In one embodiment, the second mating half of the repeatable fast exchange mount 285 is forced against the first mating half 285A by a holding force arrangement comprising permanent magnets 285C mounted in one or both of the first and second mating halves 285A or 285B. More generally, the holding force arrangement may comprise known means such as spring-loaded mechanical detents, or the like. In one embodiment, the interchangeable optics element 280 may include a collar 232 or the like, which may be guided under program control such that it is inserted between the arms of a mating fork included on a probe rack within the motion volume of a CMM, such that the interchangeable optics element 280 may be automatically removed from the base member 282.

The base member 282 is configured to hold the optical pen 220 in a stable relationship relative to an external reference frame for measurement. In some embodiments, the base housing 282A may comprise an external mounting surface configured for mounting the base member to an external element that defines the external reference frame (e.g., by clamping or otherwise mounting the base housing 282A to the external element using fasteners, or the like). For example, the external element may comprise a fixed element that defines a fixed reference frame (e.g., a mounting stand for the optical pen), or the external element may comprise a CRS probe assembly mounted to a CMM (e.g., as disclosed herein), the CRS probe assembly mounted to the CMM defining an external reference frame comprising a machine coordinate system. In various embodiments, the base member provides the sole support for the interchangeable optics element, and supports the interchangeable optics element in a very stable manner (e.g., with insignificant vibration of the interchangeable optics element in the expected measuring environment). It will be understood that the external mounting features illustrated and described herein are exemplary only, and not limiting. However, the base member and the repeatable fast exchange mount are distinguished from conventional optical fiber connectors which connect optical fibers to known optical pens. For example, such optical fiber connectors are not suitable for repeatably attaching and holding the optical pen in a stable relationship relative to an external reference frame for measurement. They do not provide adequate strength and/or rigidity for providing the sole support for an element holding the optics elements of an optical pen, such as the interchangeable optics element 280 disclosed herein.

In one embodiment, the base member 282 includes the end of an optical fiber that may be located proximate to a confocal aperture 295 that is fixed relative to the first mating half of the repeatable fast exchange mount 285, which may generally surround the confocal aperture 295. In some embodiments, the end of the optical fiber provides the confocal aperture 295. In some embodiments, the confocal aperture 295 is provided by a thin aperture element that is bonded in place proximate to or abutting the end of the optical fiber, or may be provided by a hole fabricated in (or bonded to) an optical fiber end positioning element 283B, as will be described in more detail below.

In various embodiments, an optical pen may comprise an optical fiber end positioning arrangement that locates the end of the optical fiber 212 proximate to an operational position 297 of the confocal aperture 295. In various embodiments, the operational position 297 of the confocal aperture 295 coincides with the position where the lenses of the optical pen nominally focus the measurement light that passes through the optical pen. In the particular embodiment shown in FIG. 10, the optical fiber end positioning arrangement 283 is located entirely in the base member 282 and comprises an optical fiber-holding element 283A and an optical fiber end positioning element 283B that are fixed (e.g., bonded) in the base member 282. In this embodiment, the optical fiber-holding element 283A may include some compliance in holding or positioning the optical fiber, and optical fiber end positioning element 283B is configured to stabilize the end of the optical fiber 212 proximate to the operational position 297 of the confocal aperture 295. For example, in one embodiment, the optical fiber 212 and its end may be fixed in a spring-loaded ferrule 283A' in a known type of optical fiber connector that provides the optical fiber-holding element 283A and the optical fiber end positioning element 283B. The optical fiber end positioning element 283B may include a recessed surface 283W including a light transmission hole, surrounded by a guide for the ferrule (e.g., a hole, a tapered hole, or a chamfered shoulder, or the like). The guide guides the spring-loaded ferrule to the recessed surface 283W, where it abuts the recessed surface 283W and is stabilized at a desired location defined by that recessed surface (e.g., at or proximate to the operational position 297 of the confocal aperture 295). In some embodiments, the confocal aperture 295 may consist of the end of the optical fiber 212. Alternatively, the confocal aperture 295 may be an aperture in an aperture element (e.g., a foil or thin film aperture) that is fixed relative to the end of the optical fiber (and/or the ferrule 283A'). In such cases, the optical fiber end positioning element 283B may be configured to stabilize the end of the optical fiber 212 such that the confocal aperture 295 is stabilized proximate to the operational position 297. In other embodiments, the confocal aperture comprises an aperture in an aperture element that is fixed to at least one of the optical pen base member 282 and the optical fiber end positioning element 283B at the operational position (e.g., at the recessed surface 283W). In such cases, the optical fiber end positioning element 283B is configured to stabilize the end of the optical fiber 212 proximate to the confocal aperture 295.

In some embodiments, the optical fiber-holding element 283A may receive and hold the optical fiber sufficiently rigidly relative to the base member, and thereby rigidly locate the end of the optical fiber 212 proximate to the operational position 297 of the confocal aperture 295, such that the separate optical fiber end positioning element 283B may be eliminated.

The interchangeable optics element 280 receives measurement light from, and returns measurement light to, the confocal aperture 295, and includes an optical assembly that is fixed relative to the second mating half. The optical assembly includes a chromatically dispersive optical portion 250 that provides axial chromatic dispersion of the measurement light over a respective measuring range along a measuring axis. In one embodiment, the optical assembly may also include a reflective element 294, which directs the measurement beam laterally to the axis of the optical pen 220A (e.g., laterally relative to the axis of the tube 231). In the embodiment shown in FIG. 10, the chromatically dispersive optical portion 250 includes individual lenses 252, 253, and 254, or the like. In one embodiment, the lenses 252, 253, and 254 are identical and each contributes longitudinal chromatic aberration. In one embodiment, the arrangement shown in FIG. 10 may have an optical path length of approximately 50 mm between the confocal aperture 295 and the mirror element 294. However, it will be understood that this arrangement is exemplary only and not limiting. Other usable chromatically dispersive lens assemblies are described in U.S. patent application Ser. No. 13/033,565 (the '565 application), which is hereby incorporated by reference in its entirety, and further below.

The embodiment shown in FIG. 10 further includes the transfer lens (or lens assembly) 251 located between the confocal aperture 295 and the chromatically dispersive optics portion 250, to receive light from, and focus measurement light proximate to, the operational position 297 of the confocal aperture 295. Some exemplary "bounding" confocal rays (or ray segments) are illustrated in FIG. 10. In particular, rays R1 and R2 are shown between a transfer lens 251 and the aperture 295, and rays R3 and R4 are shown between the transfer lens 251 and the chromatically dispersive optical portion 250. The transfer lens 251 may be a collimating or nearly collimating lens in some embodiments, and the rays R3 and R4 are shown to be approximately parallel or approximately collimated which provides advantages in certain implementations, as will be described in more detail below. Rays R5 and R6 are shown within the chromatically dispersive optical portion 250, and emerge as rays R7 and R8 in the measurement beam 296. It will be appreciated that the operational position 297 of the confocal aperture is proximate to or at the best focus position of the lens system of the optical pen 220, and in particular, the focal position of the transfer lens 251, in this particular embodiment.

FIGS. 11A and 11B are diagrams illustrating two exemplary embodiments of interchangeable optics elements that may be utilized in combination with the base member 282 of the optical pen of FIG. 10. As shown in FIG. 11A, the interchangeable optics element 280 is relatively identical to the interchangeable optics element 280 illustrated in FIG. 10. For purposes of comparison, as shown in FIG. 11B, the interchangeable optics element 280B has a relatively longer tube 231B. In this particular embodiment, the transfer lens 251 is a collimating lens that provides approximately parallel rays. Thus, the spacing between the transfer lens 251 and the chromatically dispersive optical portion 250 can effectively be made to have any length, which can be advantageous for different measurement applications where a relatively longer tube 231B is desirable (e.g., for allowing the interchangeable optics element 280B to measure deeper in a hole). Except for the extension of the spacing between the transfer lens 251 and the chromatically dispersive optical portion 250, the interchangeable optics element 280B may use the same lens elements and operating principles as the interchangeable optics element 280, in some embodiments.

Figure 12:
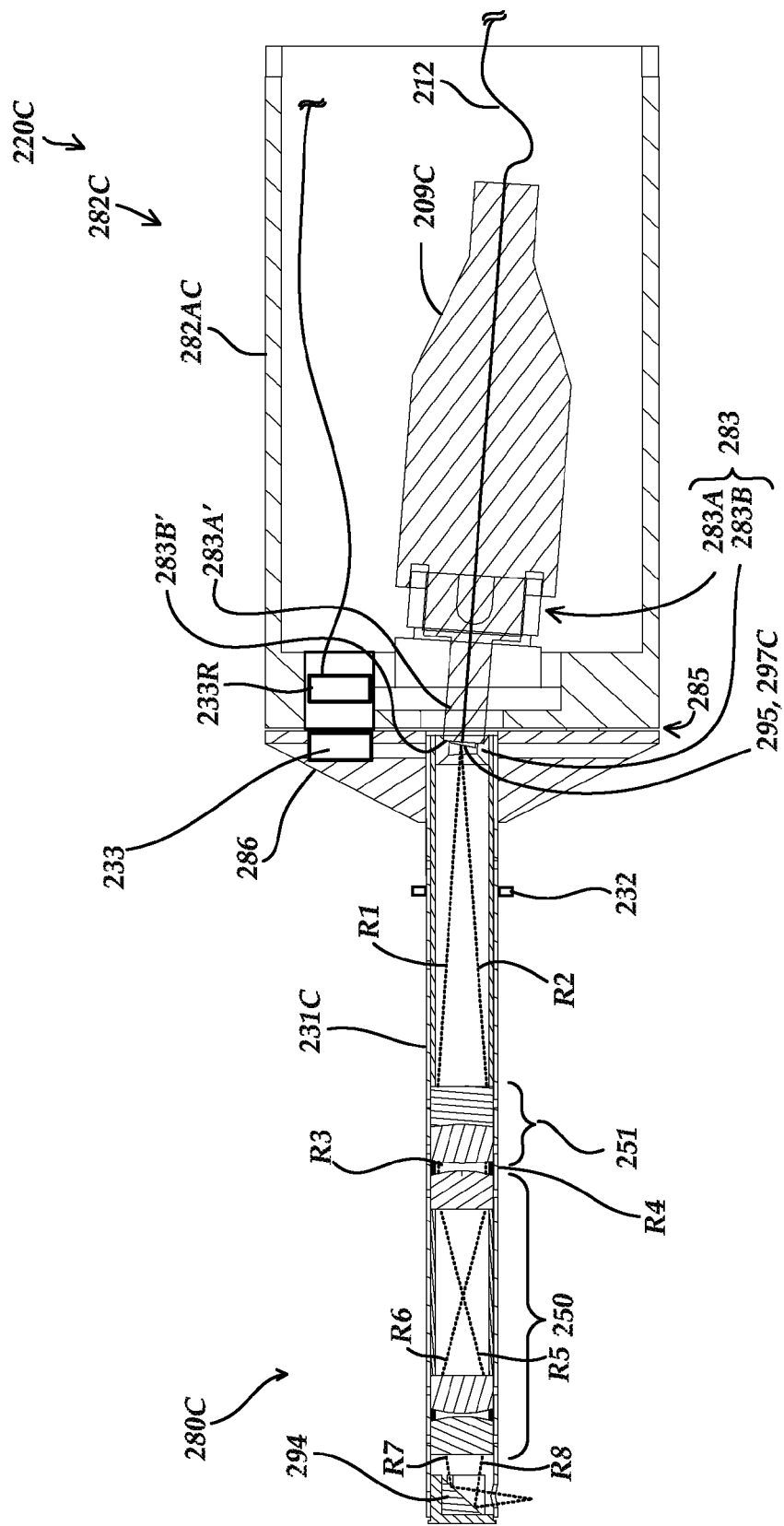
FIG. 12 is a diagram illustrating the components of an exemplary embodiment of an optical pen in which an operational position of the optical pen confocal aperture is located within the interchangeable optics element.

FIG. 12 is a diagram illustrating the components of an exemplary embodiment of an optical pen 220C, which may be similar to the previously described optical pen 220, except an operational position 297C of the optical pen confocal aperture is located within an interchangeable optics element 280C. As such, in the embodiment shown in FIG. 12, the optical assembly of the interchangeable optics element 280C may include an optical fiber end positioning element 283B analogous to that previously described with reference to FIG. 10. In other words, in the illustrated embodiment, the optical pen 220C may comprise an optical fiber end positioning arrangement 283 that locates the end of the optical fiber 212 proximate to an operational position 297 of the confocal aperture 295 in the interchangeable optics element 280C. In the particular embodiment shown in FIG. 12, the optical fiber end positioning arrangement 283 is located partially in the base member 282, comprising the optical fiber-holding element 283A, and partially in the interchangeable optics element 280C, comprising the optical fiber end positioning element 283B, which may be fixed (e.g., bonded) in the interchangeable optics element 280C. In this embodiment, the optical fiber-holding element 283A may include some compliance in holding or positioning the optical fiber, and optical fiber end positioning element 283B is configured to stabilize the end of the optical fiber 212 proximate to the operational position 297 of the confocal aperture 295. For example, in one embodiment, the optical fiber 212 and its end may be fixed in a spring-loaded ferrule 283A' in a type of optical fiber connector that provides the optical fiber-holding element 283A and extends beyond the surfaces of the repeatable fast exchange mount 285 and into the interchangeable optics element 280C. The optical fiber end positioning element 283B is adapted for mounting in the interchangeable optics element 280C. The optical fiber end positioning element 283B may include a recessed surface 283W including a light transmission hole, surrounded by a guide for the ferrule (e.g., a hole, a tapered hole, or a chamfered shoulder, or the like). The guide guides the spring-loaded ferrule to the recessed surface 283W, where it abuts the recessed surface 283W and is stabilized at a desired location defined by that recessed surface (e.g., at or proximate to the operational position 297 of the confocal aperture 295). In some embodiments, the confocal aperture 295 may consist of the end of the optical fiber 212. Alternatively, the confocal aperture 295 may be an aperture in an aperture element (e.g., a foil or thin film aperture) that is fixed relative to the end of the optical fiber (and/or the ferrule 283A'). In such cases, the optical fiber end positioning element 283B may be configured to stabilize the end of the optical fiber 212 such that the confocal aperture 295 is stabilized proximate to the operational position 297. In other embodiments, the confocal aperture comprises an aperture in an aperture element that is fixed to at least one of the interchangeable optics element 280C and the optical fiber end positioning element 283B at the operational position (e.g., at the recessed surface 283W). In such cases, the optical fiber end positioning element 283B is configured to stabilize the end of the optical fiber 212 proximate to the confocal aperture 295. An advantage of locating the optical fiber end positioning element 283B in the interchangeable optics element 280C is that the location of the confocal aperture 295 relative to the other optical elements may be more accurate and repeatable as the interchangeable optics element 280C is removed and reinstalled to the base member 280, because the repeatable fast exchange mount 285 need not affect that relative location.

It will be understood the embodiment outlined above is exemplary only, and not limiting. In some embodiments where it is desired to have the operational position 297 of the confocal aperture 295 extend into the interchangeable optics element 280C, the optical fiber-holding element 283A may receive and hold the optical fiber sufficiently rigidly relative to the base member 280 and the interchangeable optics element 280C when it is retained in position using the repeatable fast exchange mount 285, and thereby rigidly locate the end of the optical fiber 212 proximate to the operational position 297 of the confocal aperture 295 in the interchangeable optics element 280C, such that the separate optical fiber end positioning element 283B may be eliminated.

FIGS. 13A and 13B are diagrams illustrating two exemplary embodiments of interchangeable optics elements 280D and 280E for an optical pen 220D in which a transfer lens 251 is located in the base member 282D. The optical pen 220D may be understood based on its similarity to the previously described optical pen 220, except the base member 282D is shown to have an extended section 282DX which includes the transfer lens 251. The transfer lens 251 may be spaced at the proper distance from the confocal aperture 295 by a tubular section 282DX', or by machined mounting surfaces, or the like.

FIG. 13A illustrates an interchangeable optics element 280D. The rays R1 and R2 travel from the transfer lens 251 through the extended section 282DX to a focal point approximately at the operational position 297 where the aperture 295 is located. The approximately parallel rays R3 and R4 from the transfer lens 251 travel through the repeatable fast exchange mount 285 and through a tube 231D to the chromatically dispersive optical portion 250.

One advantage of including the transfer lens 251 in the base member 282D is that the confocal aperture 295 can be located precisely at the focus of the transfer lens 251 (i.e., at the operational position 297), with the assembly remaining relatively undisturbed thereafter. This is in contrast to having the repeatable fast exchange mount 285 located between the aperture 295 and the transfer lens 251, wherein the tolerances and repeatability of the repeatable fast exchange mount 285 may affect the location of the confocal aperture 295 relative to the other optical components of the optical pen which may introduce slight calibration and/or accuracy errors. In addition, for similar reasons, if the interchangeable optics element 280D is rotated (e.g., as will be described in more detail below with respect to FIG. 15), the rotation will have less of an effect on the confocal optical path, since any "wobble" will not disturb the relationship between the transfer lens 251 and the aperture 295. Instead, any wobble will only affect a small part of the relatively large collimated beam diameter indicated by the rays R3 and R4 (due to the rays R3 and R4 being in parallel and covering an area close to the tube 282DX' diameter), and so will create relatively little disturbance as a percentage of the overall light transmitted from the transfer lens 251. As another advantage, the interchangeable optics element 280D is made to be relatively less expensive to produce, due to the transfer lens 251 being included in the base member 282D.

In FIG. 13B, an interchangeable optics element 280E is illustrated that is also attachable through the fast exchange mount 285 to the base member 282D of FIG. 13A. As shown in FIG. 13B, a longer tube 231E is provided, and a chromatically dispersive optical portion 250E is shown to include additional lenses. The additional lenses 252' and 253' illustrate a technique of cascading dispersive optical elements for extending the measuring range, as described in more detail in the previously incorporated '565 application.

It will be appreciated that the interchangeable optics elements 280E and 280D are interchangeable on the base member 282D, with the interchangeable optics element 280E being able to measure in a deeper hole, for example, and also provide a different (longer) measuring range than the interchangeable optics element 280D. It will also be appreciated that a technique of cascading dispersive optical elements for extending the measuring range as illustrated in the interchangeable optics element 280E may be used in an interchangeable optics element that includes a transfer lens (e.g., similar to the interchangeable optics element 280B shown in FIG. 11B), and may be interchanged on the base member 282, in that case.

FIGS. 14A and 14B are diagrams illustrating two exemplary embodiments of interchangeable optics elements and an optical pen in which a transfer lens is located in an extended tubular section of a base member. As shown in FIG. 14A, a base member 282F has a body 282AF which includes an extended tubular section 282FX. The interchangeable optics element 280F includes an extended and wider tubular section 231FX which is part of the tube 231F, and which accommodates the extended tubular section 282FX when the base member 282F is coupled to the interchangeable optics element 280F by the repeatable fast exchange mount 285. It will be appreciated that, as illustrated in FIG. 14A, when the interchangeable optics element 280F is detached from the base member 282F, the break in the optical path does not need to be in the same location as the elements of repeatable fast exchange mount 285. More specifically, as illustrated in FIG. 14A, the break in the optical path occurs between the transfer lens 251 and the chromatically dispersive optical portion 250 at the end of the tube 282FX, as opposed to the location of the repeatable fast exchange mount 285 which is closer to the operational position 297.

Some of the advantages of having the transfer lens 251 located within the base member 282F are the same as those described above with respect to FIG. 13A. One particular advantage of the configuration of FIG. 14A is that the base member 282F is made to be more compact, particularly in the area of the extended tubular section 282FX, as compared to the extended section 282DX of FIG. 13A. One limiting factor of the configuration of FIG. 14A is that the tube extension 282FX from the base member 282F requires the interchangeable optics portion 280F to be installed by relatively careful motion along the axis of the tube 231F and tubular section 231FX. In the case of a collision, such a configuration does not allow for an easy breakaway of the interchangeable optics element 280F, as is possible in other configurations utilizing the repeatable fast exchange mount 285 (e.g., in the configuration illustrated in FIG. 13A).

As shown in FIG. 14B, an interchangeable optics element 280G is also attachable to the base member 282F through the repeatable fast exchange mount 285. Similar to the configuration in FIG. 14A, in FIG. 14B an extended portion 231GX of a tube 231G is shown to have a wider dimension for accommodating the extended tubular section 282FX from the base member 282F. One difference of the configuration of the interchangeable optics element 280G of FIG. 14B is that the tube 231G is shown to have a longer dimension. As described above in more detail with respect to FIG. 11B, due to the nature of the transfer lens 251, the rays R3 and R4 to the chromatically dispersive optical portion 250 are in parallel, such that the tube 231G can be effectively made to have any desired length.

Figure 15:
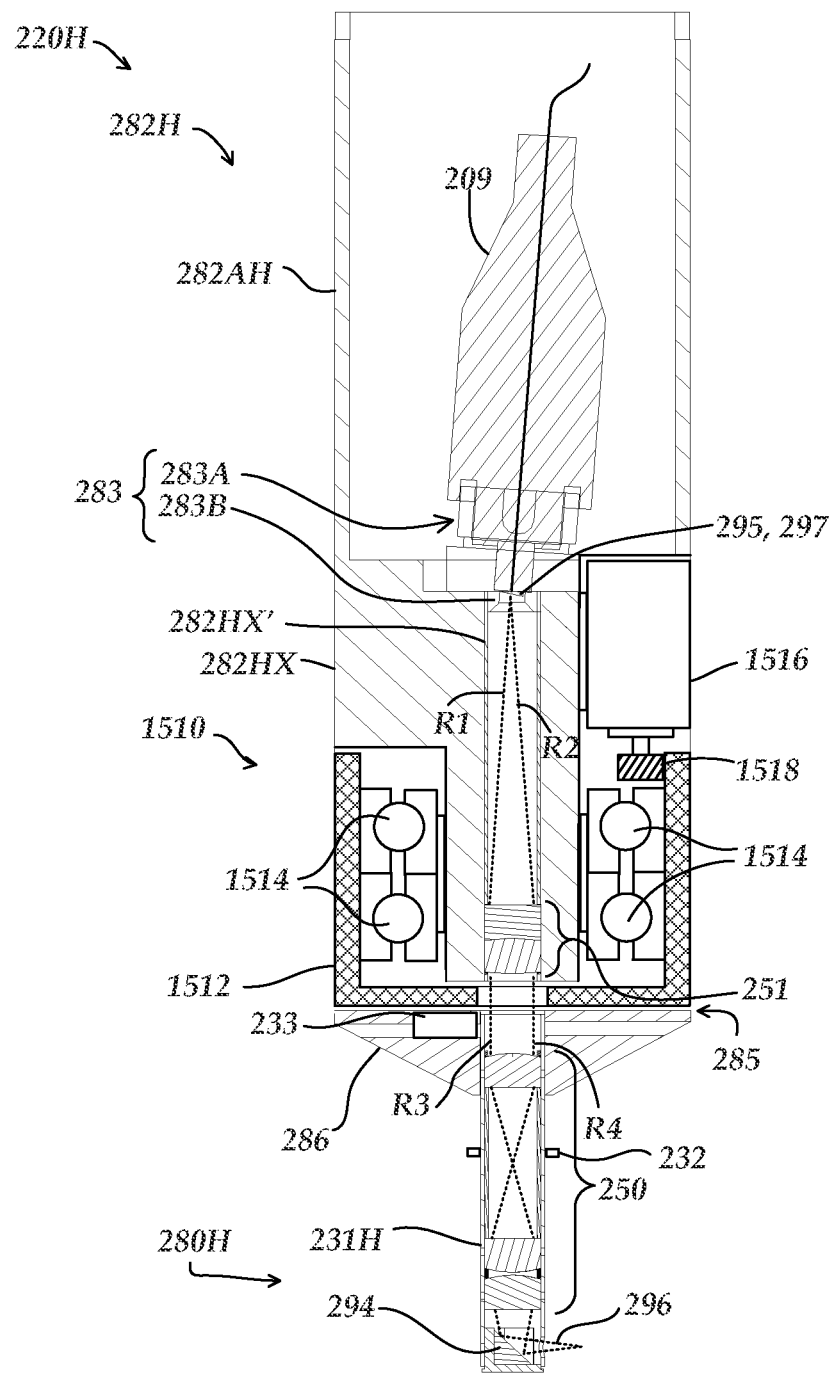
FIG. 15 is a diagram illustrating the components of an exemplary embodiment of an optical pen which includes a rotary portion for rotating an interchangeable optics element.

FIG. 15 is a diagram illustrating the components of an exemplary embodiment of an optical pen 220H which includes a rotary element 1510 for rotating an interchangeable optics element 280H and the direction of the measurement beam 296. As shown in FIG. 15, the base member 282H is configured to include the components of the rotary element 1510. The optical pen 220H is otherwise similar to the optical pen 220D of FIG. 13A, wherein the transfer lens 251 may be located within an extended section 282HX of the base member 282H.

As shown in FIG. 15, the rotary element 1510 includes a rotating portion 1512, which in this particular embodiment includes a surface for providing a first mating half of the repeatable fast exchange mount 285. The first mating half is coupled to the second mating half of the fast exchange mount 285 which is located on the front plate 286, in a similar configuration to that described above with respect to the FIGS. 4A and 4B. The rotary element 1510 also includes bearings 1514 which allow the rotating portion 1512 to rotate, as well as a motor 1516 and gears 1518 for driving the rotation. Alternative configurations may also be utilized for the motor and rotation actuation (e.g., a motorized sleeve configuration, etc.). As described above with respect to FIG. 13A, the rotation will produce smaller errors/effects when the transfer lens 251 is located in the base member 282H, due to the fact that the optical transmission of the broad collimated beam indicated by the parallel rays R3 and R4 passing through the rotation joint is less sensitive to changing alignment. However, it will be appreciated that this arrangement is exemplary only, and not limiting. Any of the previous configurations of FIGS. 10-14 may be altered to include similar components for rotating the interchangeable optics elements, with minor adaptations that will be apparent based on this disclosure. In some embodiments, for the best calibration and accuracy regardless of the rotation position, the optical pen may be characterized by calibration data that includes unique respective calibration data corresponding to a plurality of respective rotary positions of the interchangeable optics element. Such calibration may compensate for various misalignments that may be a function of the rotation position.

Figure 16:
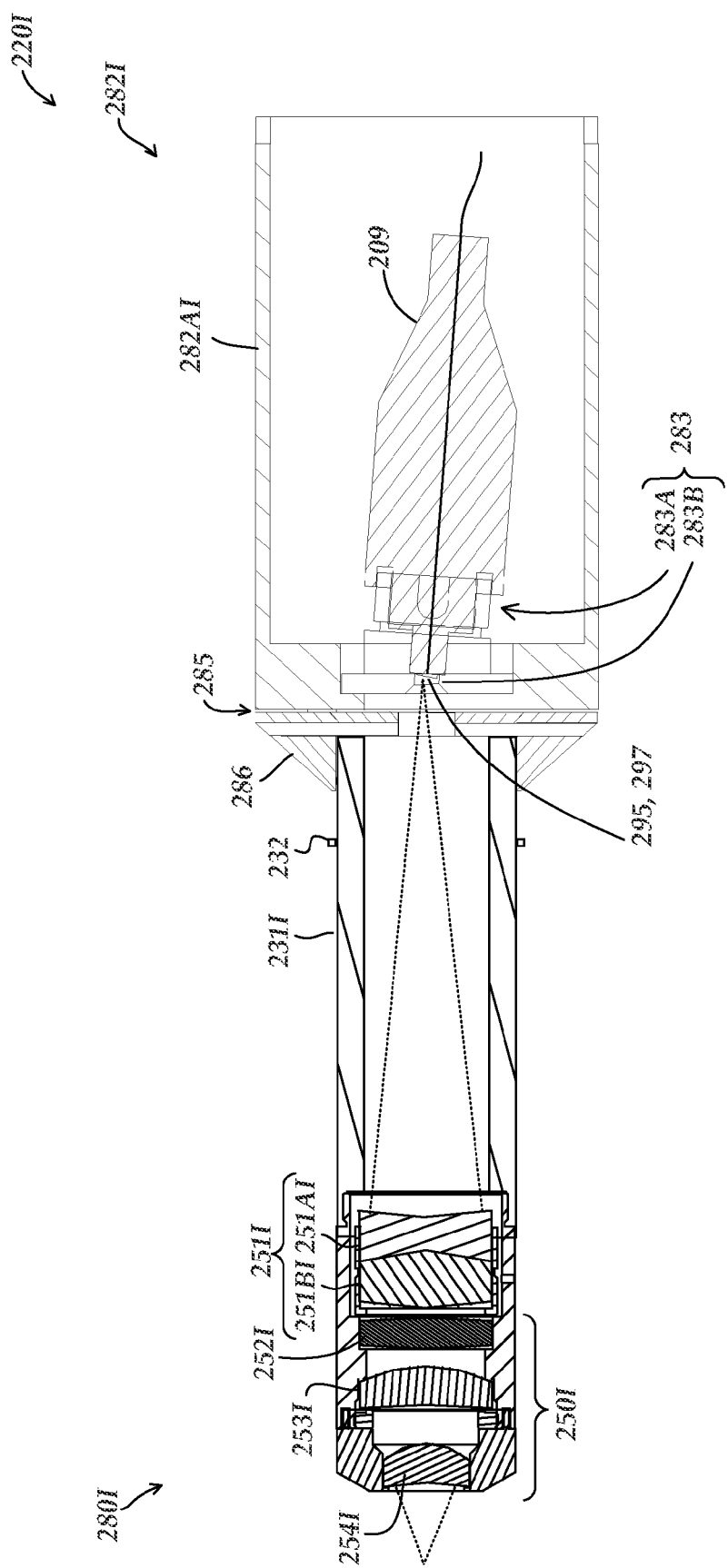
FIG. 16 is a diagram illustrating the components of an exemplary embodiment of an optical pen in which an interchangeable optics element includes a high-accuracy axial measurement beam configuration.

FIG. 16 is a diagram illustrating the components of an exemplary embodiment of an optical pen 220I in which an interchangeable optics element 280I includes a high-accuracy axial measurement beam configuration. In the illustrated embodiment, the interchangeable optics element 280I is also interchangeable with the interchangeable optics element 280 on the base member 282 shown in FIG. 10. The high-accuracy axial measurement beam configuration is described in more detail in U.S. Pat. No. 7,626,705, which is commonly assigned and hereby incorporated by reference in its entirety. As described in the '705 patent, a chromatically dispersive optical portion 250I includes a bi-convex lens element 252I, and meniscus lens elements 253I and 254I. A doublet lens element 251I is formed from a first lens portion 251AI and a second lens portion 251BI. In various embodiments, the doublet lens element 251I may either be a cemented doublet or an airspace doublet. The meniscus lens elements 253I and 254I have both surfaces curved in the same direction, and are oriented so as to provide positive optical power and focus the radiation output from the lens configuration.

The configuration of the optical pen 220I, including the interchangeable optics element 280I, illustrates that various types of optical arrangements and optical elements may be utilized in an interchangeable optics element. In addition, it will be appreciated that while the configurations of FIGS. 10-15 generally illustrate lateral measurement beams, in other configurations, axial or other directional measurement beam configurations may also be utilized, such as the axial measurement beam configuration for the optical pen 220I of FIG. 16. Furthermore, the optical pen 220I may, in alternative embodiments, be made to include additional elements such as some of those described above with respect to FIGS. 10-15 (e.g., an ID element, a lateral deflector that is added to achieve a lateral measurement beam in possible combination with a rotary portion for rotating the interchangeable optics element 280I, etc.).

Figure 17:
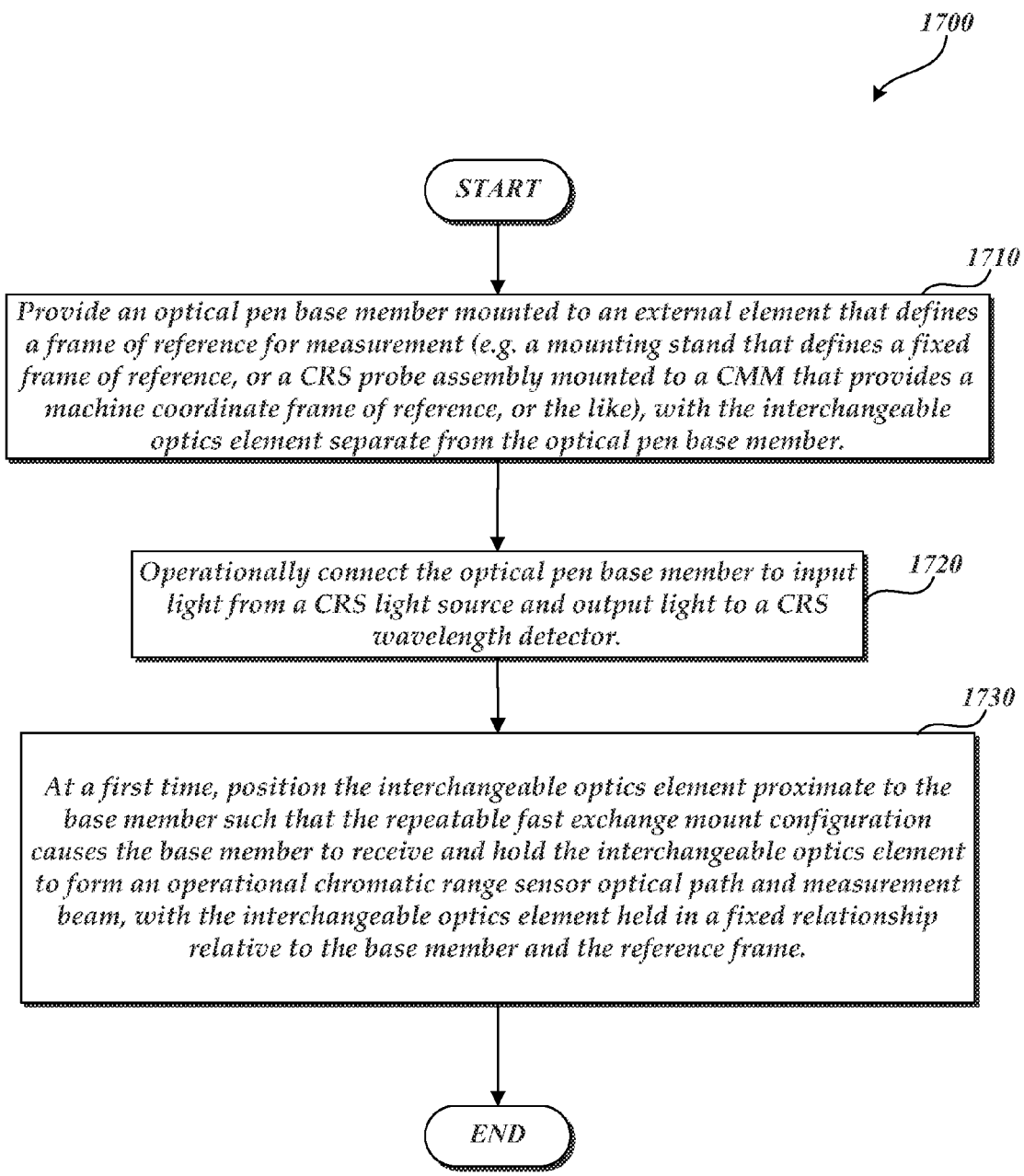
FIG. 17 is a flow diagram illustrating one exemplary embodiment of a routine for using an optical pen including a repeatable fast exchange mount, a base member, and an interchangeable optics element.

FIG. 17 is a flow diagram illustrating one exemplary embodiment of a routine 1700 for using an optical pen including a repeatable fast exchange mount, a base member, and an interchangeable optics element. At a block 1710, an optical pen base member is provided mounted to an external element that defines a frame of reference for measurement (e.g., a mounting stand that defines a fixed frame of reference, or a CRS probe assembly mounted to a CMM that provides a machine coordinate frame of reference, or the like), and the interchangeable optics element is separate from the optical pen base member. At a block 1720, the optical pen base member is operationally connected to input light from a CRS light source and output light to a CRS wavelength detector. At a block 1730, at a first time, the interchangeable optics element is positioned proximate to the base member such that the repeatable fast exchange mount configuration causes the base member to receive and hold the interchangeable optics element to form an operational chromatic range sensor optical path and measurement beam, with the interchangeable optics element held in a fixed relationship relative to the base member and the reference frame. For example, a user may position the interchangeable optics element by hand, or a CMM may automatically pick up the interchangeable optics element from an auto change rack by moving the base member such that the interchangeable optics element is properly positioned relative to the base member. Of course, it will be understood based on the foregoing disclosure that the repeatable fast exchange mount is configured such that at a second time, the interchangeable optics element is easily removed from the base member by manual or automatic operations (e.g., by approximately reversing the positioning operations used at the block 1730).

Figure 18:
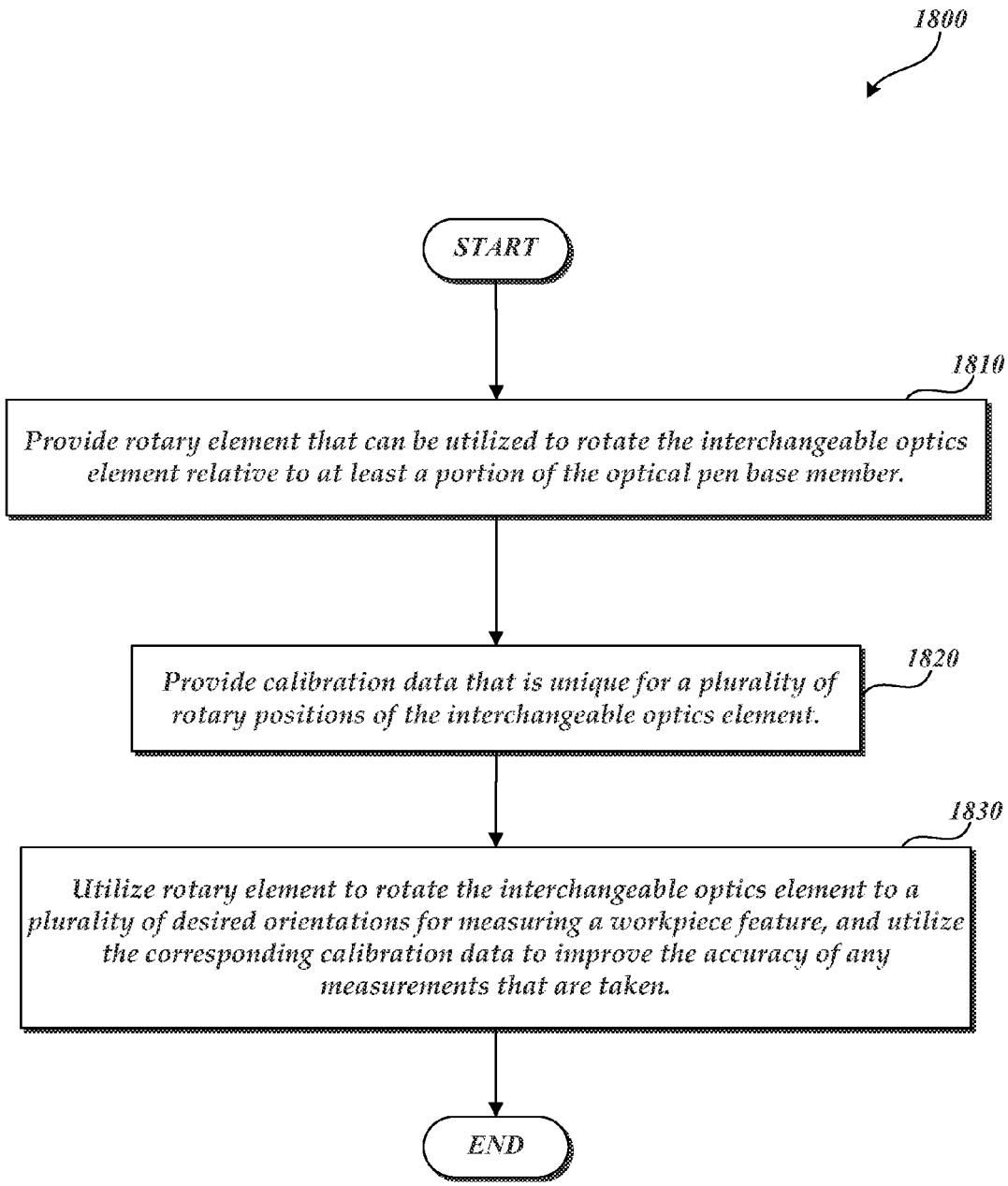
FIG. 18 is a flow diagram illustrating one exemplary embodiment of a routine for providing an optical pen with a rotary element for rotating an interchangeable optics element.

FIG. 18 is a flow diagram illustrating one exemplary embodiment of a routine 1800 for providing an optical pen with a rotary element for rotating an interchangeable optics element. At a block 1810, a rotary element is provided that can be utilized to rotate the interchangeable optics element relative to at least a portion of the optical pen base member. At a block 1820, calibration data is provided that is unique for a plurality of rotary positions of the interchangeable optics element. At a block 1830, the rotary element is utilized to rotate the interchangeable optics element to a plurality of desired orientations for measuring a workpiece feature, and the corresponding calibration data is utilized to improve the accuracy of any measurements that are taken.

While various embodiments have been illustrated and described, numerous variations in the illustrated and described arrangements of features and sequences of operations will be apparent to one skilled in the art based on this disclosure. For example, although the embodiments described above have emphasized control and data signals that are output in the form of signals conducted through the probe autojoint connection 230, some or all of the signals could be wirelessly transmitted and bypass the probe autojoint connection 230. It will be appreciated that a feature of the CRS probe configurations disclosed herein that allows them to be self-contained and automatically exchangeable is that they are configured to generate and process the light used for measurement entirely within the CRS probe assembly. After the light is processed to determine the output spectral profile data, it may be wirelessly transmitted to avoid extraneous optical fiber connections outside of the CRS probe assembly, if desired. Thus, it will be appreciated that various changes can be made therein without departing from the spirit and scope of the claimed subject matter.

The embodiments of the invention in which an exclusive property or privilege is claimed are defined as follows:

1. An optical pen for use in a chromatic range sensor (CRS) comprising:
   a confocal optical path including at least a confocal aperture and a chromatically dispersive optics portion, the optical pen configured to focus different wavelengths at different distances along a measurement axis proximate to a workpiece surface to be measured;
   an interchangeable optics element which includes the chromatically dispersive optics portion;
   an optical pen base member configured to hold the optical pen in a stable relationship relative to an external reference frame for measurement; and
   a repeatable fast exchange mount comprising a first mating half located on the base member and a second mating half located on the interchangeable optics element, the repeatable fast exchange mount configured such that at a first time, the repeatable fast exchange mount allows the base member to receive and hold the interchangeable optics element in a fixed relationship relative to the base member and the external reference frame.

2. The optical pen of claim 1, wherein the optical pen comprises an optical fiber end positioning arrangement including at least an optical fiber-holding element included in the optical pen base member, wherein the optical fiber-holding element receives an optical fiber that is connected to a light source and a detector of the CRS system and holds the optical fiber relative to the base member such that the optical fiber end positioning arrangement locates the end of the optical fiber proximate to an operational position of the confocal aperture.

3. The optical pen of claim 2, wherein the optical fiber end positioning arrangement includes an optical fiber end positioning element included in one of the optical pen base member and the interchangeable optics element, wherein the optical fiber end positioning element is configured to stabilize the end of the optical fiber proximate to the operational position of the confocal aperture.

4. The optical pen of claim 3, wherein the confocal aperture comprises one of a) the end of the optical fiber, and b) an aperture in an aperture element fixed relative to the end of the optical fiber, and the optical fiber end positioning element is configured to stabilize the end of the optical fiber such that the confocal aperture is stabilized proximate to the operational position.

5. The optical pen of claim 3, wherein the optical fiber end positioning element is included in the base member, the confocal aperture comprises an aperture in an aperture element that is fixed to at least one of the optical pen base member and the optical fiber end positioning element at the operational position, and the optical fiber end positioning element is configured to stabilize the end of the optical fiber proximate to the confocal aperture.

6. The optical pen of claim 3, wherein the optical fiber end positioning element is included in the interchangeable optics element, the confocal aperture comprises an aperture in an aperture element that is fixed to at least one of the interchangeable optics element and the optical fiber end positioning element at the operational position, and the optical fiber end positioning element is configured to stabilize the end of the optical fiber proximate to the confocal aperture when the base member receives and holds the interchangeable optics element in the fixed relationship.

7. The optical pen of claim 1, wherein the optical pen base member comprises a housing including the first mating half of the repeatable fast exchange mount and in which the confocal aperture is fixed relative to the first mating half.

8. The optical pen of claim 7, wherein the first mating half comprises an end surface of the housing.

9. The optical pen of claim 1, wherein the interchangeable optics element comprises an optical assembly that is fixed relative to the second mating half, the optical assembly comprising the chromatically dispersive optics portion and configured to receive measurement light from and return measurement light to the confocal aperture, and configured to provide axial chromatic dispersion of the measurement light over a respective measuring range along a measuring axis.

10. The optical pen of claim 9, wherein the optical assembly further comprises a transfer lens configured to focus measurement light proximate to the operational position of the confocal aperture.

11. The optical pen of claim 10, wherein the operational position of the confocal aperture is located within the interchangeable optics element, and the optical assembly further comprises at least one of an optical fiber end positioning element located proximate to the operational position and an aperture element including an aperture located proximate to the operational position.

12. The optical pen of claim 10, wherein the operational position of the confocal aperture is located within the optical pen base member, and the base member further comprises at least one of an optical fiber end positioning element located proximate to the operational position and an aperture element including an aperture located proximate to the operational position.

13. The optical pen of claim 9, wherein the interchangeable optics element further comprises a tube and a front plate, the tube at least partially enclosing the chromatically dispersive optics portion, the front plate being located proximate to an end of the tube, and the second mating half comprising a surface of the front plate which faces away from the chromatically dispersive optics portion.

14. The optical pen of claim 1, wherein the second mating half of the repeatable fast exchange mount is magnetically forced against the first mating half of the repeatable fast exchange mount by a permanent magnet mounted in one of the first and second mating halves of the repeatable fast exchange mount.

15. The optical pen of claim 1, wherein the interchangeable optics element further comprises an auto handling element that interfaces to a changing device that is utilized for connecting and separating the second mating half of the repeatable fast exchange mount to and from the first mating half of the repeatable fast exchange mount.

16. The optical pen of claim 1, wherein the interchangeable optics element further comprises an ID element that is utilized for identifying the interchangeable optics element.

17. The optical pen of claim 16, wherein the ID element comprises a passive radio frequency identification device.

18. The optical pen of claim 1, wherein the confocal optical path comprises a transfer lens located between the confocal aperture and the chromatically dispersive optics portion, the transfer lens configured to focus measurement light proximate to the operational position of the confocal aperture.

19. The optical pen of claim 18, wherein the transfer lens is configured such that measurement light located between the transfer lens and the chromatically dispersive optics portion is approximately collimated.

20. The optical pen of claim 18, wherein the transfer lens is located on the optical pen base member.

21. The optical pen of claim 20, wherein the confocal aperture is located in the optical pen base member.

22. The optical pen of claim 18, wherein the transfer lens is located on the interchangeable optics element.

23. The optical pen of claim 22, wherein the confocal aperture is located in the optical pen base member.

24. The optical pen of claim 22, wherein the operational position of the confocal aperture is located in the interchangeable optics element.

25. The optical pen of claim 1, wherein the base member further comprises a rotary element which includes the first mating half and which rotates the interchangeable optics element relative to at least a portion of the optical pen base member.

26. The optical pen of claim 25, wherein the optical pen is characterized by calibration data that includes unique respective calibration data corresponding to a plurality of respective rotary positions of the interchangeable optics element.

27. The optical pen of claim 1, wherein the optical pen is included in a chromatic range sensor (CRS) probe system capable of being automatically connected to a coordinate measuring machine (CMM) under program control, the CRS probe system comprising:
   an auto exchange joint element which is attachable through an auto exchange joint connection to the CMM; and
   a CRS probe assembly that is mounted to the auto exchange joint element, for automatic connection to the CMM through the auto exchange joint element,
   wherein the CRS probe assembly comprises:
      the optical pen;
      an electrically powered light source which receives electrical power transmitted through the auto exchange joint element and generates light originating in the CRS probe assembly, the light comprising an input spectral profile of wavelengths routed to the optical pen; and
      a CRS wavelength detector comprising a plurality of pixels distributed along a measurement axis of the CRS wavelength detector, the plurality of pixels receiving respective wavelengths and providing output spectral profile data;

wherein the CRS probe assembly is configured to receive power and control signals through the auto exchange joint connection;

wherein the CRS probe assembly is configured such that when the auto exchange joint element is attached to the CMM and the optical pen is operably positioned relative to a workpiece surface to perform measurement operations and the electrically powered light source generates the light, the optical pen inputs the input spectral profile and outputs corresponding radiation to the workpiece surface and receives reflected radiation from the workpiece surface and outputs reflected radiation from the confocal optical path to provide an output spectral profile to the CRS wavelength detector, the output spectral profile comprising a distance-dependent profile component having a wavelength peak that indicates a measurement distance from the optical pen to the workpiece surface, and the CRS wavelength detector provides corresponding output spectral profile data; and the CRS probe assembly is configured to output measurement signals based on the output spectral profile data, the output measurement signals being indicative of a measurement distance to the workpiece surface.

28. The optical pen of claim 27, wherein at the first time, the CRS probe assembly includes the optical pen base member and is already connected to the CMM through the auto exchange joint connection and the interchangeable optics element is separate from the optical pen base member, and the repeatable fast exchange mount is configured such that when the interchangeable optics element is positioned proximate to the base member based on operations performed automatically by the CMM at the first time, the base member receives and holds the interchangeable optics element to form an operational chromatic range sensor optical path and measurement beam, with the interchangeable optics element held in a fixed relationship relative to the base member and the reference frame.

29. The optical pen of claim 28, wherein, at a second time after the first time, the CRS probe assembly is already connected to the CMM through the auto exchange joint connection and includes the optical pen base member and the interchangeable optics element, and the repeatable fast exchange mount is configured such that at the second time the interchangeable optics element is removable from the base member based on operations performed automatically by the CMM, without disconnecting the auto exchange joint connection that connects the CRS probe assembly to the CMM.

30. The optical pen of claim 1, wherein the optical pen base member comprises an external mounting surface configured for mounting the base member to an external element that defines the external reference frame.

31. The optical pen of claim 30, wherein the external element comprises one of a) a fixed element that defines a fixed reference frame, and b) a CRS probe assembly mounted to a CMM, the CRS probe assembly mounted to the CMM defining an external reference frame comprising a machine coordinate system.

* * * * *